US008022142B2

(12) United States Patent
Jiang et al.

(10) Patent No.: US 8,022,142 B2
(45) Date of Patent: *Sep. 20, 2011

(54) THERMOPLASTIC OLEFIN COMPOSITIONS

(75) Inventors: Peijun Jiang, League City, TX (US); Armenag H. Dekmezian, Austin, TX (US); Kevin R. Squire, Kingwood, TX (US); Carlos U. de Gracia, Laporte, TX (US); Keith Edward Jolibois, Friendswood, TX (US); Cesar A. Garcia-Franco, Houston, TX (US); Ronald Raymond Thackston, Dickinson, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/335,252

(22) Filed: Dec. 15, 2008

(65) Prior Publication Data

US 2010/0152382 A1 Jun. 17, 2010

(51) Int. Cl.
*C08L 23/04* (2006.01)
*C08L 23/10* (2006.01)

(52) U.S. Cl. .................. 525/191; 525/240

(58) Field of Classification Search .................. 525/191, 525/240
See application file for complete search history.

(56) References Cited

U.S. PATENT DOCUMENTS

| | | | |
|---|---|---|---|
| 2,852,501 A | 9/1958 | Richard, Jr. et al. | |
| 4,438,238 A | 3/1984 | Fukushima et al. | |
| 4,461,873 A | 7/1984 | Bailey et al. | |
| 4,999,403 A | 3/1991 | Datta et al. | |
| 5,082,902 A | 1/1992 | Gurevitch et al. | |
| 5,084,534 A | 1/1992 | Welborn, Jr. et al. | |
| 5,096,867 A | 3/1992 | Canich | |
| 5,166,268 A | 11/1992 | Ficker | |
| 5,306,775 A | 4/1994 | Martin et al. | |
| 5,326,835 A | 7/1994 | Ahvenainen et al. | |
| 5,350,817 A | 9/1994 | Winter et al. | |
| 5,382,631 A | 1/1995 | Stehling et al. | |
| 5,408,017 A | 4/1995 | Turner et al. | |
| 5,504,171 A | 4/1996 | Etherton et al. | |
| 5,514,761 A | 5/1996 | Etherton et al. | |
| 5,516,848 A | 5/1996 | Canich et al. | |
| 5,539,056 A | 7/1996 | Yang et al. | |
| 5,696,045 A | 12/1997 | Winter et al. | |
| 5,756,608 A | 5/1998 | Langhauser et al. | |
| 5,962,595 A | 10/1999 | Dolle et al. | |
| 5,969,062 A | 10/1999 | Moll et al. | |
| 5,998,547 A | 12/1999 | Hohner | |
| 6,084,041 A | 7/2000 | Andtsjöet al. | |
| 6,114,457 A | 9/2000 | Marketl et al. | |
| 6,114,477 A | 9/2000 | Merrill et al. | |
| 6,117,962 A | 9/2000 | Weng et al. | |
| 6,143,846 A | 11/2000 | Herrmann et al. | |
| 6,147,180 A | 11/2000 | Markel et al. | |
| 6,158,771 A | 12/2000 | Nusser et al. | |
| 6,184,327 B1 | 2/2001 | Weng et al. | |
| 6,197,791 B1 | 3/2001 | Venkatesan et al. | |
| 6,197,910 B1 | 3/2001 | Weng et al. | |
| 6,207,606 B1 | 3/2001 | Lue et al. | |
| 6,225,432 B1 | 5/2001 | Weng et al. | |
| 6,248,832 B1 | 6/2001 | Peacock | |
| 6,248,833 B1 | 6/2001 | Colucci et al. | |
| 6,251,997 B1 | 6/2001 | Imai et al. | |
| 6,258,903 B1 | 7/2001 | Mawson et al. | |
| 6,271,323 B1 | 8/2001 | Loveday et al. | |
| 6,284,833 B1 | 9/2001 | Ford et al. | |
| 6,287,705 B1 | 9/2001 | Seta et al. | |
| 6,297,301 B1 | 10/2001 | Erderly et al. | |
| 6,319,998 B1 | 11/2001 | Cozewith et al. | |
| 6,323,284 B1 | 11/2001 | Peacock | |
| 6,342,574 B1 | 1/2002 | Weng et al. | |
| 6,355,741 B1 | 3/2002 | Marechal | |
| 6,362,270 B1 | 3/2002 | Chaudhary et al. | |
| 6,423,793 B1 | 7/2002 | Weng et al. | |
| 6,441,111 B1 | 8/2002 | Ushioda et al. | |
| 6,444,773 B1 | 9/2002 | Markel | |
| 6,512,019 B1 | 1/2003 | Agarwal et al. | |
| 6,555,635 B2 | 4/2003 | Markel | |
| 6,562,914 B1 | 5/2003 | Andtsjöet al. | |
| 6,569,965 B2 | 5/2003 | Markel et al. | |
| 6,573,350 B1 | 6/2003 | Markel et al. | |
| 6,583,227 B2 * | 6/2003 | Mehta et al. | 525/240 |
| 6,635,715 B1 | 10/2003 | Datta et al. | |
| 6,642,316 B1 | 11/2003 | Datta et al. | |
| 6,660,809 B1 | 12/2003 | Weng et al. | |

(Continued)

FOREIGN PATENT DOCUMENTS

CA 2118711 3/1993

(Continued)

OTHER PUBLICATIONS

Lohse et al., *Graft Copolymer Compatibilizers for Blends of Polypropylene and Ethylene-Propylene Copolymers*, Macromolecules, 1991, vol. 24, No. 2, pp. 561-566.

Markel et al., *Metallocene-Based Branch-Block Thermoplastic Elastomers*, Macromolecules, 2000, vol. 33, No. 23, pp. 8541-8548.

Arriola et al., *Catalytic Production of Olefin Block Copolymers via Chain Shuttling Polymerization*, Science, 2006, vol. 312, pp. 714-719.

Dankova et al., *Models for Conformationally Dynamic Metallocenes. Copolymerization Behavior of the Unbridged Metallocene (1-Methyl-2-phenylindenyl)(2-phenylindenyl)zirconium Dichloride*, Macromolecules, 2002, vol. 35, No. 8, pp. 2882-2891.

Paavola et al., *Propylene Copolymerization With Non-conjugated Dienes and α-olefins Using Supported Metallocene Catalyst*, Polymer, 2004, vol. 45, No. 7, pp. 2099-2110.

(Continued)

Primary Examiner — Nathan M Nutter
(74) Attorney, Agent, or Firm — Darryl M. Tyus

(57) ABSTRACT

An in-reactor polymer blend including (a) a propylene-containing first polymer; and (b) propylene-containing second polymer having a different crystallinity from the first polymer. The polymer blend has a melting temperature, Tm, of at least 135° C., a melt flow rate of at least 70 dg/min, a tensile strength of at least 8 MPa, an elongation at break of at least 300%.

25 Claims, 4 Drawing Sheets

U.S. PATENT DOCUMENTS

| | | |
|---|---|---|
| 6,750,307 B2 | 6/2004 | Weng et al. |
| 6,774,191 B2 | 8/2004 | Weng et al. |
| 6,806,316 B2 | 10/2004 | Mehta et al. |
| 6,815,508 B1 | 11/2004 | Terano et al. |
| 7,101,936 B2 | 9/2006 | Weng et al. |
| 7,223,822 B2 | 5/2007 | Abhari et al. |
| 7,256,240 B1 | 8/2007 | Jiang et al. |
| 7,279,536 B2 | 10/2007 | Brant et al. |
| 7,294,681 B2 | 11/2007 | Jiang et al. |
| 7,365,136 B2 | 4/2008 | Huovinen et al. |
| 7,524,910 B2 | 4/2009 | Jiang et al. |
| 7,541,402 B2 | 6/2009 | Abhari et al. |
| 7,550,528 B2 | 6/2009 | Abhari et al. |
| 7,585,917 B2 | 9/2009 | Datta et al. |
| 2001/0007896 A1 | 7/2001 | Agarwal et al. |
| 2002/0013440 A1 | 1/2002 | Agarwal et al. |
| 2003/0040201 A1 | 2/2003 | Ishizuka et al. |
| 2003/0114595 A1 | 6/2003 | Van Dun et al. |
| 2004/0054100 A1 | 3/2004 | Debras et al. |
| 2004/0122191 A1 | 6/2004 | Arjunan et al. |
| 2004/0127614 A1 | 7/2004 | Jiang et al. |
| 2004/0127654 A1 | 7/2004 | Brant et al. |
| 2004/0220320 A1 | 11/2004 | Abhari et al. |
| 2004/0220336 A1 | 11/2004 | Abhari et al. |
| 2004/0249046 A1 | 12/2004 | Abhari et al. |
| 2004/0249084 A1 | 12/2004 | Stevens et al. |
| 2004/0260025 A1 | 12/2004 | Ravishankar et al. |
| 2006/0173132 A1 | 8/2006 | Mehta et al. |
| 2006/0199873 A1 | 9/2006 | Mehta et al. |
| 2006/0211819 A1 | 9/2006 | Hoenig et al. |
| 2006/0241254 A1 | 10/2006 | Razavi |
| 2006/0281868 A1 | 12/2006 | Sudhin et al. |
| 2006/0293453 A1 | 12/2006 | Jiang et al. |
| 2006/0293455 A1 | 12/2006 | Jiang et al. |
| 2006/0293460 A1 | 12/2006 | Jacob et al. |
| 2006/0293461 A1 | 12/2006 | Jiang et al. |
| 2006/0293462 A1 | 12/2006 | Jacob et al. |
| 2007/0129497 A1 | 6/2007 | Jiang et al. |
| 2007/0282073 A1 | 12/2007 | Weng et al. |
| 2007/0284787 A1 | 12/2007 | Weng et al. |
| 2008/0027173 A1 | 1/2008 | Ravishankar |
| 2008/0033124 A1 | 2/2008 | Jiang et al. |
| 2010/0152360 A1* | 6/2010 | Jiang et al. ............ 524/515 |

FOREIGN PATENT DOCUMENTS

| | | |
|---|---|---|
| EP | 0 206 515 | 12/1986 |
| EP | 0 129 368 | 7/1989 |
| EP | 0 366 411 | 5/1990 |
| EP | 0 423 962 | 4/1991 |
| EP | 0 527 589 | 2/1993 |
| EP | 0 619 325 | 10/1994 |
| EP | 0 719 802 | 7/1996 |
| EP | 0 749 992 | 12/1996 |
| EP | 0 877 039 | 11/1998 |
| EP | 1 195 391 | 4/2002 |
| EP | 1 008 607 | 12/2003 |
| JP | 08-041253 | 2/1996 |
| JP | 08-208535 | 8/1996 |
| JP | 10-045834 | 2/1998 |
| JP | 10-110003 | 4/1998 |
| JP | 10-110068 | 4/1998 |
| JP | 3421202 | 6/2003 |
| JP | 2004-231844 | 8/2004 |
| JP | 2004-359911 | 12/2004 |
| WO | WO 92-14766 | 9/1992 |
| WO | WO 93-11171 | 6/1993 |
| WO | WO 96-12744 | 5/1996 |
| WO | WO 96-34023 | 10/1996 |
| WO | WO 97-11098 | 3/1997 |
| WO | WO 97-45434 | 12/1997 |
| WO | WO 98/32784 | 7/1998 |
| WO | WO 98/49229 | 11/1998 |
| WO | WO 00-12572 | 3/2000 |
| WO | WO 00-37514 | 6/2000 |
| WO | WO 01/09200 | 2/2001 |
| WO | WO 01/42322 | 6/2001 |
| WO | WO 01-46273 | 6/2001 |
| WO | WO 01/81493 | 11/2001 |
| WO | WO 02-50145 | 6/2002 |
| WO | WO 02-090399 | 11/2002 |
| WO | WO 03/040201 | 5/2003 |
| WO | WO 04-026921 | 4/2004 |
| WO | WO 2004/060994 | 7/2004 |
| WO | WO 2007/001644 | 1/2007 |
| WO | WO 2007/044544 | 4/2007 |

OTHER PUBLICATIONS

Tynys et al., *Copolymerisation of 1,9-decadiene and Propylene With Binary and Isolated Metallocene Systems*, Polymer, 2007, vol. 48, No. 10, pp. 2793-2805.

Ye et al., *Synthesis and Rheological Properties of Long-Chain-Branched Isotactic Polypropylenes Prepared by Copolymerization of Propylene and Nonconjugated Dienes*, Ind. Eng. Chem. Res., 2004, vol. 43, No. 11, pp. 2860-2870.

Suzuki et al., Olefin Polymerization Using Highly Congested *ansa*-Metallocenes under High Pressure: Formation of Superhigh Molecular Weight Polyolefins, Macromolecules, 2000, vol. 33, No. 3, pp. 754-759.

Schaverien et al., Ethylene Bis(2-indenyl) Zirconocenes: A New Class of Diastereomeric Metallocenes for the (Co)Polymerization of α-Olefins, Organometallics, 2001, vol. 20, No. 16, pp. 3436-3452.

Lehmus et al., Metallocene-PP Produced Under Supercritical Polymerization Conditions, 1$^{st}$ Blue Sky Conference on Catalytic Olefin Polymerization, Jun. 17-20, 2002, Sorrento, Italy, Poster #58.

* cited by examiner

THERMOPLASTIC OLEFIN COMPOSITIONS

FIELD OF THE INVENTION

This invention relates to thermoplastic olefin compositions, their production and their use in forming molded components.

BACKGROUND OF THE INVENTION

Thermoplastic olefins (TPOs), impact copolymers (ICPs) and thermoplastic vulcanizates (TPVs), collectively referred to herein as "heterogeneous polymer blends", comprise an isotactic polypropylene thermoplastic phase and a high molecular weight or crosslinked elastomeric phase. These heterogeneous polymer blends also commonly include non-polymeric components, such as fillers and other compounding ingredients. The heterogeneous polymer blends have multiphase morphology where a thermoplastic such as isotactic polypropylene (often referred as the hard phase) forms a continuous matrix phase and the elastomeric component (often referred as the soft phase), generally derived from an ethylene containing copolymer, is the dispersed component. The polypropylene matrix imparts tensile strength and chemical resistance to the TPO, while the ethylene copolymer imparts flexibility and impact resistance.

TPOs and ICPs are typically made during the polymerization process by differential polymerization of the polymer components, although some can also be made by mechanical blending. TPVs are also blends of thermoplastic and elastomer, like TPOs, except that the dispersed elastomeric component is crosslinked or vulcanized in a reactive extruder during compounding. Cross-linking of the elastomeric phase generally allows dispersion of higher amounts of rubber in the polymer matrix, stabilizes the obtained morphology by preventing coalescence of rubber particles, and enhances mechanical properties of the blend.

Traditionally, the elastomeric component in heterogeneous polymer blends has been provided by highly amorphous, very low density ethylene-propylene copolymers (EP) and ethylene-propylene-diene terpolymers (EPDM) having a high molecular weight. Recently, other ethylene-alpha olefin copolymers have been used, especially very low density ethylene-butene, ethylene-hexene and ethylene-octene copolymers which generally have a lower molecular weight. The density of these latter polymers is generally less than 0.900 g/cm$^3$, indicative of some residual crystallinity in the polymer.

The major market for TPOs is in the manufacture of automotive parts, especially bumper fascia. Other applications include automotive interior components such as door skins, air bag covers, side pillars and the like. These parts are generally made using an injection molding processes. To increase efficiency and reduce costs it is necessary to decrease molding times and reduce wall thickness in the molds. To accomplish these goals, manufacturers have turned to high melt flow polypropylenes (Melt Flow Rate>35 dg/min.). These high melt flow rate (MFR) resins are low in molecular weight and consequently difficult to toughen, resulting in products that have low impact strength. It would be desirable to have a polymer blend with greater elongation to break and more toughness, improved processability, and/or a combination thereof.

In addition, in-reactor blends have been sought as an alternative to physical blending since in-reactor blends offer the possibility of improved mechanical properties through more intimate mixing between the hard and soft phases, through the generation of hard/soft cross products, as well as lower production costs. Use of compatibilizer is another way to improve interfacial tension between hard and soft phases in the heterogeneous blend, thereby improving the mechanical properties.

Thus, known compositions have low molecular weight and low toughness or may have a higher molecular weight (low melt flow rate) in order to meet the required mechanical strength for the targeted applications but lack processability. Blends with both good mechanical properties and high melt flow rate as well as processes to produce them would be useful in the art, especially for applications such as injection molding.

SUMMARY OF THE INVENTION

Accordingly, embodiments of the invention provided a polymer blend, and an in-reactor process for producing the same, wherein the blend exhibits a unique combination of a high melt flow rate combined with high tensile strength, tear strength and elongation at break, making it attractive for injection molding applications and particularly for injection molding components having a scratch resistant skin.

In one aspect, the present invention resides in an in-reactor polymer blend comprising (a) a propylene-containing first polymer; and (b) propylene-containing second polymer having a different crystallinity from the first polymer, wherein the polymer blend has a melting temperature, Tm, of at least 135° C., a melt flow rate of at least 70 dg/min, a tensile strength of at least 8 MPa, an elongation at break of at least 300%.

In another aspect, the present invention resides in an in-reactor polymer blend comprising (a) a propylene-containing first polymer; and (b) propylene-containing second polymer having a different crystallinity from the first polymer, wherein the polymer blend has a melting temperature, Tm, of at least 135° C., a melt flow rate of at least 70 dg/min, a tensile strength of at least 8 MPa, an elongation at break of at least 300%, and a branched block product having peaks between 44 and 45 ppm in the $^{13}$C-NMR spectrum.

Particular such polymer blends have a melting temperature, Tm, of at least 140° C.

Some such blends have a complex viscosity at 190° C. of less than 4000 Pa·s and may exhibit near Newtonian flow behavior.

Conveniently, the difference in crystallinity between said first and second polymers is at least 5%, such as at least 10%, for example at least 15%. Generally, the first polymer has a crystallinity of at least 5% and said second polymer has a crystallinity of less than 50%.

In one embodiment, the polymer blend comprises at least 30 wt. % of the lower crystallinity polymer component.

Conveniently, the first polymer comprises a propylene homopolymer and the second polymer comprises a copolymer of propylene with ethylene or a $C_4$ to $C_{20}$ α-olefin, especially a $C_4$ to $C_8$ α-olefin. In one embodiment, said second polymer is a copolymer of ethylene with propylene.

In some embodiments, the first propylene containing polymer has a higher crystallinity than the second propylene polymer and has a weight averaged molecular weight ranging from about 20,000 g/mol to about 150,000 g/mol; particularly about 50,000 g/mol to about 110,000 g/mol; more particularly about 80,000 g/mol to about 100,000 g/mol.

In a further aspect, the present invention resides in a process for producing the in-reactor polymer blend described herein, the process comprising:

(i) polymerizing at least one first monomer composition comprising propylene in a first polymerization zone under conditions sufficient to produce a propylene containing first polymer comprising at least 50% vinyl unsaturation based on the total unsaturated olefin chain ends; and (ii) contacting at least part of said first polymer with a second monomer composition comprising propylene in a second polymerization zone separate from said first polymerization zone under conditions sufficient to polymerize said monomer to produce a second polymer different in crystallinity from said first polymer by at least 5%.

Conveniently, the conditions employed in said polymerizing (i) comprise a first temperature and the conditions employed in said contacting (ii) include a second temperature higher than said first temperature. In one embodiment, said first temperature is between about 70° C. and about 180° C. and said second temperature is between about 80° C. and about 200° C.

DETAILED DESCRIPTION OF THE EMBODIMENTS

Figure 1:
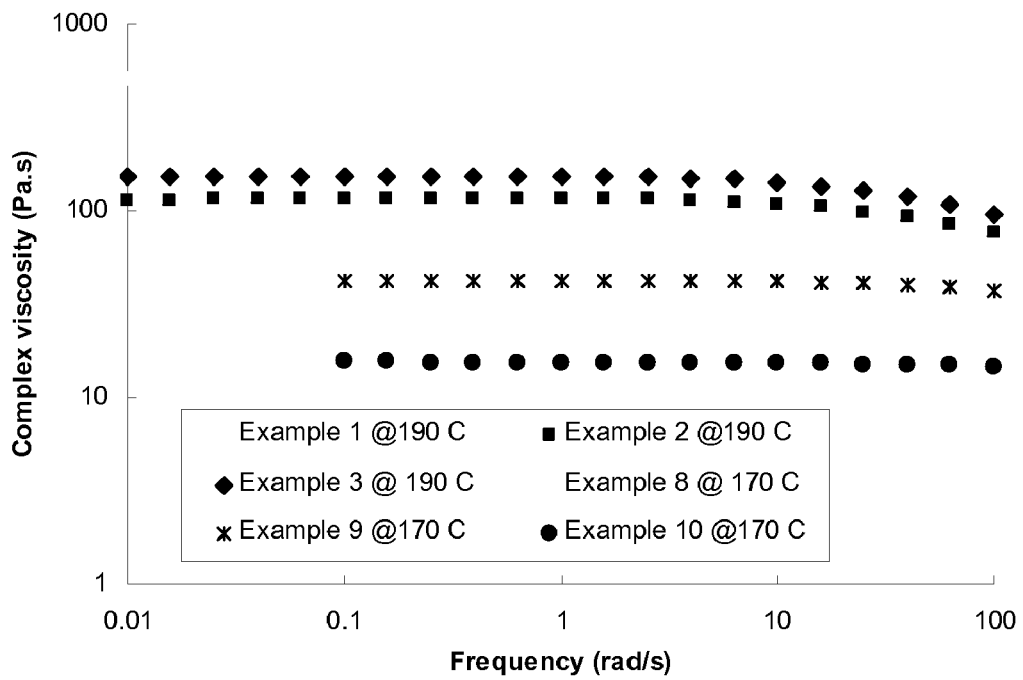
FIG. 1 is a graphic illustration of the relationship between the complex viscosity and frequency for the in-reactor polymer blends produced in Examples 1 to 3 (measured at a temperature of 190° C.) and Examples 8-10 (measured at a temperature of 170° C.).

As used herein the term "Newtonian flow behavior" is intended to designate a polymer blend characterized by a complex viscosity, measured at 190° C. over a frequency range from 0.01 to 20 rad/sec that is essentially independent of frequency (in other words, viscosity that is independent of shear rate). In contrast most polymeric systems display shear-thinning behavior in which the complex viscosity diminishes with increasing frequency in an oscillatory shear experiment.

As used herein the term "in-reactor polymer blend" is intended to mean a mixture of polymers produced in a plurality of polymerization zones in the same polymerization process/system without the need for post polymerization blending (although the resultant copolymer can undergo post polymerization blending, for example, to incorporate modifiers and additives). Each polymer component in the mixture possesses a unique molecular structure such as percent comonomer content, molecular weight and molecular architecture such as branched block copolymers.

A polymerization zone is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

As used herein the term "branched block copolymer" is defined as the cross-product obtained when a first polymer chain (also referred as macromonomer) with reactive polymerizable chain ends is incorporated into a second polymer chain during the polymerization of the latter. The resulting product comprises a backbone defined by one of the polymer chains with branches of the other polymer chains extending from the backbone, wherein the backbone and branches possess different and unique molecular structures, such as chemical composition and crystallinity. For example, a polypropylene homopolymer with vinyl chain ends can be incorporated into a propylene copolymer chain to form a branched cross-product with a propylene copolymer backbone and polypropylene side branches. Since the molecular structure/composition in the backbone and branches are different, the branched block composition has characteristics from both the backbone and the branches. Branched block copolymers are also referred to as branched cross-products. In one embodiment, the branches are comprised of homo-polypropylene and the backbone is comprised of propylene copolymers with at least one monomer selected from ethylene or $C_4$ to $C_{12}$ alpha olefin. In another embodiment, both the backbone and branches in the branched block copolymer are comprised of propylene copolymers, wherein the difference in crystallinity between the copolymers in backbone and branches is at least 5%, preferably at least 10%, more preferably at least 20%.

To effectively incorporate a reactive polymer chain into other growing polymer chains, it is preferable that the first polymerization step produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. Vinyl terminated chains are generally more reactive than vinylene or vinylidene terminated chains. Generally, it is desirable that the first polymerization step produces a first polymer having at least 50%, such as at least 60%, for example at least 70%, even at least 80% of vinyl terminal unsaturation based on the total unsaturated olefin chain ends. Unsaturated chain ends can be determined using proton NMR.

Polymer Blend

The in-reactor polymer blend described herein has a unique combination of easy flow (high melt flow rate) and strong mechanical properties such as elongation and tensile strength and comprises a propylene-containing first polymer; a propylene-containing second polymer different in crystallinity from the first polymer by at least 5%, typically at least 10%. Preferably, the more crystalline material is employed as the first polymer and hence as the side branches of the branched block copolymer. The term "crystalline" as used herein, characterizes those polymers that possess high degrees of inter- and intra-molecular order in the solid state. Alternatively, a less crystalline material is employed as the first polymer and hence as the side branches of a branched block copolymer having a more crystalline backbone.

Generally, although not necessarily, the blends include at least a small amount of cross-product, the desirable amount of which will depend on the desired application. Particularly where the amount of cross-product is small it is considered to be a part of the propylene-containing second polymer. Such cross-product is also referred to as a branched block copolymer having a backbone comprising the second polymer and branches comprising the first polymer.

Alternatively, the cross-product may be thought of as a third component that contributes to the properties of propylene-containing second polymer and the blend in general. In blends where the cross-product is present and considered separately from the propylene-containing second polymer, the blends may be described as having greater than 0 wt. % to about 60 wt. % of the cross-product. Depending on the application, some embodiments include from about 2 wt. % to about 10 to 20 wt. %. Some other applications may include from about 20 wt. % to about 30 wt. %. Still other applications will conveniently include from about 30 wt. % to about 60 wt. % of the cross-product in the blend. The amount of cross-product is based on the total weight of the cross-product, the propylene-containing first polymer component and the propylene-containing second polymer.

The first and second polymers for the in-reactor polymer blend may each be selected from a propylene homopolymer, a semi-crystalline propylene copolymer and an amorphous thermoplastic elastomer of propylene. Any of the homopolymer, semi-crystalline propylene copolymer and amorphous elastomer can be used as either the branches or the backbone in the branched block composition.

In one embodiment, the first or the second polymer component is a propylene homopolymer. Preferably, the polypropylene is isotactic, highly isotactic, or highly syndiotactic polypropylene. As used herein, "isotactic" is defined as having at least 20% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. The propylene homopolymer can be used as either the first or second polymer, or as the side branches or backbone of the branched block copolymer, but generally is used as the first polymer, namely as the side branches of the branched block copolymer.

Particularly useful propylene homopolymers have a crystallinity of at least 30%, generally at least 40% as determined by differential scanning calorimetry (DSC) as described herein. Heat of fusion is another measure of crystallinity and useful propylene homopolymers typically have a heat of fusion greater than 60 J/g, alternatively at least 70 J/g, alternatively at least 80 J/g, alternatively at least 90 J/g, as determined by DSC analysis. Suitable propylene homopolymers typically have a melting temperature of at least 100° C., generally at least 130° C., even at least 150° C.

Useful propylene homopolymers normally have a weight averaged molecular weight of less than 200,000 g/mol, such as 150,000 g/mol or less and a MFR of 10 dg/min or greater, conveniently 50 dg/min or greater, especially 100 dg/min or greater, particularly 200 dg/min or greater.

In another embodiment, a semi-crystalline propylene copolymer is employed as either the first or second polymer in the polymer blend and as either the backbone or side branches in the branched block structure. The propylene copolymer is generally made with a polymerization catalyst which forms essentially or substantially isotactic propylene sequences, but which introduces stereo- and regio-errors in the incorporation of propylene in the copolymer. Stereo errors are those where the propylene inserts in the chain with a tacticity that is not isotactic. Propylene molecules are usually added head-to-tail and not tail-to-tail or head-to-head. Head-to-tail addition results in a polypropylene chain with pendant methyl groups attached to alternating carbons. This alternating arrangement is disrupted when tail-to-tail or head-to-head addition occurs. A regio error is one where the propylene inserts with the methylene group or the methine group adjacent to a similar group in the propylene inserted immediately prior to it. Such errors are more prevalent after the introduction of comonomer, such as ethylene or 1-hexene, in the semi-crystalline propylene copolymer. While not wishing to be bounded by this theory, it is believed that the introduction of these errors in the introduction of propylene, particularly in the presence of comonomer, is important in the use of these propylene copolymers as the semi-crystalline propylene copolymer. Notwithstanding the presence of these errors, the semi-crystalline propylene copolymer is statistically random in the distribution of comonomer.

Typically, the semi-crystalline propylene copolymer is made with a single site metallocene catalyst that allows only a single statistical mode of addition of propylene and comonomer in a well-mixed, continuous monomer feed stirred tank polymerization reactor and that allows only a single polymerization environment for all of the polymer chains of the semi-crystalline propylene copolymer.

Suitable semi-crystalline propylene copolymers are formed by polymerizing propylene and at least one of comonomer selected from ethylene and $C_4$ to $C_{12}$ α-olefins, such as 1-butene, 1-pentene, 1-hexene, 1-heptene, 1-octene, 1-nonene, 1-decene, 2-methyl-1-propene, 3-methyl-1-pentene, 4-methyl-1-pentene, 5-methyl-1-hexene, and mixtures thereof. Copolymers of propylene with another α-olefin, such as 1-butene, 1-pentene, 2-methylpentene, 1,3-methyl-1-butene; 1-hexene, 3-methyl-1-pentene, 4-methyl-1-pentene, 3,3-dimethyl-1-butene; methyl-1-hexene; dimethyl-1-pentene trimethyl-1-butene; ethyl-1-pentene; methyl-1-pentene; dimethyl-1-hexene; trimethyl-1-pentene; ethyl-1-hexene; methylethyl-1-pentene; diethyl-1-butene; propyl-1-pentene; methyl-1-nonene; 1-nonene; dimethyl-1-octene; trimethyl-1-heptene; ethyl-1-octene; methylethyl-1-butene; diethyl-1-hexene and 1-dodecene, may also be used. Copolymers of ethylene and propylene are more preferred.

Preferred semi-crystalline propylene copolymers have a peak melting temperature from 10 to 150° C., typically from 30 to 140° C.; a weight averaged molecular weight of 200,000 g/mol or less, such as 150,000 g/mol or less; and a crystallization temperature of 0° C. or higher, typically 20° C. or higher. Moderate levels (5 to 10%) of crystallinity are also desirable for applications where elastic properties are important.

In another embodiment, the first or the second polymer is an amorphous thermoplastic elastomer. As used herein an amorphous polymer is defined to be an olefin polymer having a crystallinity of less than 5% as determined by DSC. Generally, the amorphous polymer is a propylene copolymer with at least one monomer selected from ethylene or $C_4$ to $C_{12}$ alpha-olefin, such as 1-butene, 1-heptene, 1-hexene, 1-octene, 1-decene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin, such as 1-butene, 1-pentene, 2-methylpentene, 1,3-methyl-1-butene; 1-hexene, 3-methyl-1-pentene, 4-methyl-1-pentene, 3,3-dimethyl-1-butene; methyl-1-hexene; dimethyl-1-pentene trimethyl-1-butene; ethyl-1-pentene; methyl-1-pentene; dimethyl-1-hexene; trimethyl-1-pentene; ethyl-1-hexene; methylethyl-1-pentene; diethyl-1-butene; propyl-1-pentene; methyl-1-nonene; 1-nonene; dimethyl-1-octene; trimethyl-1-heptene; ethyl-1-octene; methylethyl-1-butene; diethyl-1-hexene and 1-dodecene, may also be used. Preferably the amorphous copolymer is the propylene/ethylene copolymer.

The amorphous nature of this component generally derives from the interruption of isotactic propylene sequences through comonomer incorporation and/or the presence of stereo- or regio-errors. The percentage of the copolymerized alpha-olefin in the amorphous copolymer is, in general, in a range of 2 wt. % to 50 wt. %, alternatively 5 wt. % to 30 wt. %. One, two or more alpha-olefins can be copolymerized with the propylene. In another embodiment, the amorphous polymer is a homopolymer such as atactic polypropylene.

Useful amorphous propylene polymers have an averaged molecular weight of 200,000 g/mol or less, such as 150,000 g/mol or less, for example 120,000 g/mol or less.

Any combination of the first and second polymer components described above can be used to form a branched block composition with a different molecular structure for the backbone from that of the side branches.

The ratio of the first polymer component to the second polymer component in the reactor blend depends on the requirements of the end-use application. The thermal properties of the final in-reactor polymer blend depend on the properties of each component and the ratio of each component in the blend. Generally, the in-reactor blend has a crystallinity of 80% or less, typically 50% or less, as calculated using heat of fusion obtained from DSC analysis. A sum of the heat of fusion from all melting peaks is used when multiple melting peaks are present. The heat of fusion for 100% crystallinity is selected from the homopolymer of the primary composition in the in-reactor polymer blend. For example, when the polymer blend is made of a propylene homopolymer and propylene/ethylene copolymer, propylene is the primary composition, and the heat of fusion of 100% crystallinity polypropylene is used. In one embodiment, the in-reactor produced polymer blend has a heat of fusion between about 10 and about 70 J/g, for example between about 10 and about 60 J/g, such as between about 20 and about 50 J/g.

Conveniently, the in-reactor blend has a melting temperature of 120° C. or more, and generally 130° C. or more, such as 140° C. or more, for example 150° C. or more. The term "melting point," as used herein, for the in-reactor polymer blend, is the highest temperature peak among principal and secondary melting peaks as determined by DSC. In one embodiment of the present invention, the polymer has a single melting peak. Typically, a sample of in-reactor polymer blend will show secondary melting peaks adjacent to the principal peak, which peaks are considered together as a single melting peak. The highest of these peaks is considered the melting point. The in-reactor polymer blend preferably has a melting point by DSC ranging from an upper limit of 170° C., 160° C., 140° C., 120° C., or 90° C., to a lower limit of 20° C., 30° C., 40° C., or 50° C.

Typically, the in-reactor blend has crystallization temperature of 130° C. or less. The term "peak crystallization temperature," as used herein, for the in-reactor polymer blend, is the highest temperature peak among principal and secondary crystallization peaks as determined by DSC. In one embodiment of the present invention, the polymer has a single crystallization peak. When the crystallinity of the first and the second polymer components in the in-reactor blend is close, the polymer blend will show secondary crystallization peaks adjacent to the principal peak, which peaks are considered together as a single crystallization peak. The highest of these peaks is considered the peak crystallization temperature. When the crystallinity of the first and the second polymer components in the in-reactor blend is far apart, the polymer blend will show two individual peaks for each component. The in-reactor polymer blend preferably has a crystallization temperature by DSC ranging from an upper limit of 120° C., 100° C., 90° C., 70° C., or 40° C., to a lower limit of 0° C., 10° C., 30° C., 40° C., or 70° C.

Conveniently, the in-reactor blend has a weight averaged molecular weight of between 5,000 g/mol and 200,000 g/mol, such as between 10,000 g/mol and 150,000 g/mol with a polydispersity index (PDI) in the range of 1.5 to 40. The polydispersity index is partially determined by the catalysts and process condition employed in the polymerization process. For example, polymerization involving multiple catalysts may produce a copolymer with broader or multimodal molecular weight distribution. Multiple reactors with different polymerization conditions may produce polymer blend with multimodal molecular weight distributions. In one embodiment the polymer blend produced may have a unimodal, bimodal, or multimodal molecular weight distribution. By bimodal or multimodal is meant that the SEC trace has more than one peak or inflection points. An inflection point is that point where the second derivative of the curve changes in sign (e.g., from negative to positive or vice versa).

The molecular weight of each component in the in-reactor blend can be optimized for a specific application. Generally, the molecular weight of the crystalline component should be greater than the entanglement molecular length, while the molecular weight of the less crystalline or amorphous component should be large enough so the crystalline component can bind the polymer segments together into a physical network in the solid state. When the molecular weight of the first polymer is low, the second polymer should have higher molecular weight to attain good mechanical strength.

The amount of the first polymer relative to the second polymer component may vary widely depending on the nature of the component polymers and intended end use of the polymer blend. In particular, however, one advantage of the present process is the ability to be able to produce a polymer blend in which the lower crystalline propylene copolymer comprises more than 20%, such as more than 50%, for example more than 70% of the total in-reactor polymer blend.

A polymer blend can be separated into fractions by solvent extraction (also referred as fractionation). A typical solvent is a saturated hydrocarbon such as hexane, cyclohexane, heptane or xylene. The extraction temperature can range from room temperature to the boiling point of the solvent. Polymers are easier to dissolve if they are pressed into a thin film and then cut into small pieces. They can also be milled into granules or powder prior to dissolving. For polymer blends containing homo-polypropylene, the polypropylene component can be separated using cyclohexane refluxing for 24 hours. The insoluble fraction comprises polypropylene and part of the branched block products. For in-reactor blends containing amorphous component, the amorphous component can be isolated by contacting the blend with cyclohexane at 25° C. for 48 hours. The soluble fraction comprises the amorphous component. Alternatively, a differential solvent fractionation of the in-reactor blend with several solvents of progressively increasing solubility and boiling point can provide several fractions. Nominally about 10 grams of the in-reactor blend is contacted with about 500 ml of cyclohexane in a thick-walled glass bottle with a screw cap closure. The sealed bottle is maintained at 25° C. for 48 hours. At the end of this period, the solution is decanted/filtered and evaporated to yield a residue of the polymer soluble to cyclohexane at 25° C. To the insoluble residue is added sufficient cyclohexane to bring the volume to about 500 ml and the bottle is then maintained at 30° C. for 48 hours. The soluble polymer is decanted/filtered and evaporated to yield a residue of the polymer soluble to cyclohexane at 30° C. In this manner, fractions of the in-reactor blends soluble at a temperature from 40° C. to 60° C. are obtained at temperature increases of approximately 5° C. between stages. Increases in temperature to over 100° C. can be accommodated if xylene, instead of cyclohexane, is used as the solvent. The temperature and temperature interval can be varied according to the distribution of the in-reactor blends.

Conveniently, the present in-reactor blend has a cyclohexane refluxing insoluble fraction of 70 wt. % or less, typically 60 wt. % or less. Alternatively, the in-reactor blend has a cyclohexane room temperature soluble fraction of 20 wt. % or more, such as 30 wt. % or more, for example 40 wt. % or more.

In one embodiment, the present in-reactor polymer blend has a fraction which elutes between 80° C. to 115° C. and a soluble fraction which elutes below 5° C. when fractionated using Temperature Rising Elution Fractionation (TREF) using the procedure described in the Examples. The fraction corresponding to the highest temperature peak is referred to as the high-crystalline fraction. The soluble fraction is therefore referred to as the amorphous elastomeric component. Depending on the crystallinity of the first and second polymers as well as the branched block composition, the peak temperature may be shifted or there may be additional peaks. Alternatively, a fraction elutes at temperature between 0° C. and 80° C. when a semi-crystalline propylene copolymer is present in the blend.

The presence of branched block structures in the present in-reactor polymer blends can be detected using nuclear magnetic resonance spectroscopy (NMR). In $^{13}$C-NMR, the polymers are dissolved in tetrachloroethane-d2 at 140° C. and the spectra are collected at 125° C. The peaks corresponding to methylenes adjacent to branch points are found between 44 and 45 ppm. Assignments for long chain branches of iPP chains are discussed by Weng, Hu, Dekmezian, and Ruff (Macromolecules 2002, 35, 3838-3843). For propylene branches between propylenes in the backbone the methylenes are found at 44.88, 44.74, and 44.08 ppm. The methine of the branch is found at 31.84 ppm. For in-reactor polymer blends with low content of branched block composition, the blends should be first fractionated using cyclohexane at room temperature, as described above. Signals for the branched block components are found in the same fractions as the homopolypropylene components.

Generally, the present in-reactor blend has a complex viscosity of 4000 Pa·s or less, preferably 2000 Pa·s or less, even more preferably 1000 Pa·s or less. The complex viscosity is measured at 190° C. over an angular frequency ranged from 0.01 to 100 rad/s using the procedure described in the Examples. Most TPOs display pseudo-plastic flow behavior and their viscosity decreases with increasing shear rate (also termed shear thinning). This shear thinning behavior can be demonstrated by the decreasing complex viscosity with increasing shear rate. However, the complex viscosity of the present polymer blend is insensitive to the frequency over a frequency range from 0.01 to 100 rad/s (i.e., insignificant shear thinning). In one embodiment, the ratio of viscosity at a frequency of 100 rad/s to zero shear viscosity is 0.25 or greater, preferably 0.30 or greater, more preferably 0.40 or greater.

The present in-reactor blend has a unique and advantageous combination of properties including:

(a) a melt flow rate (MFR) greater than 70 dg/min, such as greater than 100 dg/min, for example greater than 150 dg/min;

(b) a tensile strength (as measured by ASTM D638 at 23° C.) of 8 MPa or more, such as 10 MPa or more, for example 12 MPa or more. Tensile strength is defined as the maximum stress in the stress-strain curve;

(c) a tensile strength at break (as measured by ASTM D638 at 23° C.) of 10 MPa or more, alternatively 12 MPa or more, alternatively 15 MPa or more;

(d) an ultimate elongation (as measured by ASTM D638) of 300% or more, typically 350% or more, especially 400% or more; and (e) a Shore hardness of 15 A to 90 D, such as 30 A to 90 D (as measured by ASTM D2240).

The branched block composition in the present in-reactor blend can comprise a wide variety of structural compositions enabling the tensile properties to be tuned over a wide range. While not wishing to be bounded by any theory, it is believed that in addition to the branched block structural composition, the crystalline polymers form hard inclusions (or crystallites) within a soft matrix so physical crosslinks form in the polymer blend. The presence of physical crosslink promotes tensile properties. To be effective, the high crystalline hard inclusions must be multi-blocks with low crystalline or amorphous chain segments. The low crystalline or amorphous chain segments must long enough to span the distance between two hard inclusions or entangled with other chain segments from other hard inclusions.

In one embodiment, the side branch and backbone components are immiscible so that the blend has a heterogeneous morphology. One advantageous heterogeneous blend comprises the lower crystallinity polymer component in dispersed phase and the higher crystallinity polymer in the continuous phase. For some applications, the blends have a wide range in morphology as the components of greater and lesser crystallinity can also be co-continuous. Alternatively, the in-reactor blend can have a heterogeneous morphology with the higher crystalline component in a dispersed phase and the lesser crystalline component in a continuous phase. In any event, the sizes of the individual domains of the dispersed phase are very small with the smallest length dimension for the dispersed phase typically being less than 5 μm, such as less than 2 μm, even less than 1 μm without an added external compatibilizer. While not wishing to be restrained by any theory, we believe that the reason for the small domain size is the presence of branched block composition which has the attributes of both the first polymer and the second polymer component. In particular, we believe that such a molecule containing segments of each of the polymeric components acts like compatibilizer in the in-reactor blend. The presence of branched block composition enables immiscible components in the blend to be compatible to the extent that no compatibilizer is needed in order to attain and retain this fine morphology. Presence of fine particles of the dispersed phase generally allows dispersion of higher amounts of the dispersed phase in a polymer matrix, stabilizes the obtained morphology by preventing coalescence of the dispersed particles, and enhances mechanical properties of the blend. This also allows the production of softer in-reactor polymer blends.

Alternatively, the components on the side branches and backbone as well as individual components in the in-reactor blend are miscible. The in-reactor produced polymer blend then has homogeneous morphology. When all the individual components are capable of crystallizing to a limited extent, they are at least partially co-crystallized.

In one practical embodiment, the present reactor blend includes a branched block copolymer in which the branches are comprised of a propylene homopolymer and the backbone is comprised of a propylene copolymer with at least one monomer selected from ethylene or $C_4$ to $C_{12}$ alpha olefin. In another embodiment, both the backbone and branches in the branched block polymer are comprised of propylene copolymers, wherein the difference in crystallinity between the copolymers in backbone and branches is at least 5%, such as at least 10%, for example at least of 20%.

Process for Producing the Polymer Blend

The in-reactor polymer blend described herein may be produced by initially contacting propylene alone in a first reaction zone with a polymerization catalyst capable of producing a crystalline polypropylene having a crystallinity of 20% or more. At least part of the contents of the first reaction zone are then transferred into a separate second reaction zone together with one or more monomer selected from ethylene or $C_4$ to $C_{12}$ alpha-olefins and mixtures thereof and optionally with additional propylene so as to produce amorphous or semi-crystalline propylene copolymers in the presence of polypropylene produced.

In one embodiment, the second reaction zone employs the same catalyst system transferred from the first reaction zone, with no additional catalyst being supplied to the second reaction zone. Alternatively, an additional amount of the same catalyst system as used in the first reaction zone is fed into the second reaction. Generally between about 10% and about 90%, such as between about 20% and about 80%, for example between about 30% and about 70% of the total catalyst is supplied to the first reaction zone, with the remainder being supplied to the second reaction zone. The molar ratio of the catalyst supplied to the first reaction zone to the catalyst supplied to the second reaction zone depends on the end-use requirements of the in-reactor polymer blend.

In another embodiment, the catalyst system includes a first polymerization catalyst fed to the first reaction zone, and a second polymerization catalyst different from the first catalyst and capable of producing an amorphous poly-alpha-olefin having a crystallinity of 5% or less fed to the second reaction zone. The molar ratio of the first polymerization catalyst to the second polymerization catalyst is generally from 5:95 to 95:5 depending on the application and other process variables. The resultant intimate mixing among the different components of the in-reactor produced polymer blend provides excellent interface bonding and enhanced mechanical properties.

In one embodiment, all the propylene is fed into the first reaction zone. Alternatively, propylene feed is split between the first and second reaction zones. Generally between about 30% and about 90%, such as between about 40% and about 80%, for example between about 50% and about 70%, such as between about 45% and about 55% of the total propylene is supplied to the first reaction zone, with the remainder being supplied to the second reaction zone.

In another embodiment, the in-reactor polymer blend can be produced by contacting propylene and one or more monomers selected from ethylene or $C_4$ to $C_{12}$ alpha-olefins in a first reaction zone with a first polymerization catalyst capable of producing a crystalline polypropylene having a crystallinity of 20% or more, and then supplying at least part of the contents of the first reaction zone together with optionally additional propylene into a separate second reaction zone wherein the semi-crystalline propylene copolymer is produced in the presence of propylene copolymer produced. The crystallinity of the propylene copolymer produced in both the first and the second reaction zones is mainly controlled through comonomer incorporation. Preferably, the propylene copolymer produced in the first reaction zone has lower crystallinity. The difference in crystallinity between the two copolymers is preferably more than 5%, even more preferably more than 10%. The second reaction zone can employ the same catalyst system carried over from the first reaction zone. Alternatively, additional catalyst can be fed into the second reaction zone. Generally between about 30% and about 90%, such as between about 40% and about 80%, for example between about 50% and about 70%, such as between about 45% and about 55% of the total propylene is supplied to the first reaction zone, with the remainder being supplied to the second reaction zone. All of the ethylene or $C_4$ to $C_{12}$ alpha-olefins is supplied to the first reaction zone. In one embodiment, the conversion of ethylene or one or more $C_4$ to $C_{12}$ alpha-olefins in the first reaction zone is controlled to be above 90 wt. %, preferably above 95 wt. %, so that a propylene copolymer with higher crystallinity can be produced in the second reaction zone in series reactor polymerization without removing the unreacted monomers in between the reaction zones. Conveniently, the melting temperature of the second polymer is at least 100° C., such as at least 110° C., for example at least 120° C.

In one embodiment, the catalyst employed to produce the second polymer component is the same as, or is compatible with, the catalyst used to produce a thermoplastic first polymer component. In such a case, the first and second polymerization zones can be in a multiple-zone reactor, or separate, series-connected reactors, with the entire effluent from the first polymerization zone, including any active catalyst, being transferred to the second polymerization zone. Additional catalyst can then be added, as necessary to the second polymerization zone. In a particularly preferred embodiment, the present process is conducted in two or more series-connected, continuous flow, stirred tank or tubular reactors using metallocene catalysts.

In an alternative embodiment, the in-reactor polymer blend can be produced by contacting propylene and one or more monomers selected from ethylene or $C_4$ to $C_{12}$ alpha-olefins in a first reaction zone with a first polymerization catalyst capable of producing an amorphous propylene copolymer having a crystallinity of 5% or less, and then supplying the contents of the first reaction zone together with optionally additional propylene into a separate second reaction zone wherein the semi-crystalline propylene copolymers are produced in the presence of the amorphous propylene copolymer produced. The second reaction zone employs a catalyst system including the first polymerization catalyst, and a second polymerization catalyst capable of producing a crystalline polymer having a crystallinity of 20% or more. To enhance the crystallinity of the polymer produced in the second reaction zone, the conversion of ethylene or other $C_4$ to $C_{12}$ alpha-olefin should be high in the first reaction zone. Preferably, the monomer conversion is 85% or higher, more preferably, 90% or higher, even more preferably 95% or higher. The preferred melting temperature of the polymer produced in the second reaction zone is greater than 100° C., more preferably greater than 120° C. All propylene can be fed into the first reaction zone. Alternatively, part of the propylene is fed into the first reaction zone with the remainder being supplied to the second reaction zone.

As described above, the contents of the first reactor zone are transferred to the second reactor zone, and become a part of the reaction medium in the second reactor zone. The catalyst system employed in the first reactor zone is still active to continue the polymerization reaction in the second reactor zone. Alternatively, a part or all of the solvent and unreacted monomers are removed from the polymerization effluent in the first reactor zone, and the polymer, and remaining solvent and monomers are transferred into the second reactor zone. This can be implemented in a system with two reactors in series and a primary separator in between the two reactors. This process scheme also allows independent control of polymerization temperature in the first and second polymerization zones.

It is to be appreciated that, although the foregoing discussion refers only to first and second polymerization zones, further reaction zones could be employed, with the feed to the second reaction zone being split between the additional reaction zones. However, from an economic viewpoint, such additional reaction zones are not currently preferred.

Polymers with bimodal distributions of molecular weight and composition can be produced by the present polymerization process by, for example, controlling the polymerization conditions in the first and the second polymerization zones and/or by selecting the catalysts for the first and the second polymerizations, such as by using multiple catalysts in each polymerization zone. Bimodal distributions of molecular weight and composition of the second polymer can also be obtained when different catalysts are used in the first and second polymerization zones and the catalyst employed in the first polymerization zone is transferred into the second polymerization zone for production of the branched block polymers.

The amount of second polymer relative to the first polymer may vary widely depending on the nature of the polymers and the intended use of the final polymer blend. In particular, however, one advantage of the present process is the ability to be able to produce a polymer blend in which the second polymer comprises more than 50 wt. %, such as more than 60 wt. %, for example more than 70 wt. % of the total polymer blend. For TPE applications, the weight ratio of the second polymer to the first polymer is generally from about 90:10 to about 50:50, such as from about 80:20 to about 60:40, for example from about 75:25 to about 65:35. For TPO or impact copolymer applications, the weight ratio of the second polymer to the first polymer is generally from about 49:51 to about 10:90, such as from 35:65 to about 15:85.

In an alternative embodiment, the first step of polymerization is replaced by the use of a pre-made polymer, at least part of which has reactive polymerizable chain ends. The premade polymer can be produced in a separate system or can be a commercially available product. The crystalline thermoplastic polymer can be dissolved in a solvent and then added into a reaction medium for the second polymerization step. The crystalline thermoplastic polymer can be also ground into fine powder and then added into the reaction medium for the second polymerization step.

Any known polymerization process may be used to produce the present polymer blend. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous process is meant that there is continuous addition to, and withdrawal of reactants and products from, the reactor system. Continuous processes can be operated in steady state, i.e., the composition of effluent remains fixed with time if the flow rate, temperature/pressure and feed composition remain invariant. For example a continuous process to produce a polymer would be one where the reactants are continuously introduced into one or more reactors and polymer product is continuously withdrawn.

Preferably, the polymerization is conducted in a continuous, stirred tank reactor. Tubular reactors equipped with the hardware to introduce feeds, catalysts and scavengers in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutane, mixed butanes, hexane, pentane, isopentane, isohexane, cyclohexane, isooctane, and octane. In an alternate embodiment a perfluorocarbon or hydrofluorocarbon is used as the solvent or diluent.

More preferably, the polymerization is conducted by a continuous solution process. Monomer concentration may be varied over a wide range in a solution process. For most catalysts, high monomer concentration implies high productivity and high molecular weight of polymer formed. Polymer solubility in the reaction medium varies with the composition of the polymerization medium. The polymerization temperature and/or pressure can be adjusted to ensure a homogeneous phase polymerization under high monomer conditions. It is also desirable to have a good balance between polymer concentration, viscosity of the polymerization medium and energy consumption. Generally, the monomer concentration is 5 wt. % or more, such as 10 wt. % or more, for example 15 wt. % or more, even 20 wt. % or more, or 30 wt. % or more, based on the total weight of the polymerization medium including solvent, monomers and polymer produced.

The polymerization process conditions are generally selected to promote the production of reactive macromonomers in the first polymerization step and the incorporation of side branches into the backbone in the second polymerization step. For some metallocene catalysts, high polymerization temperatures enhance the population of reactive macromonomer polypropylenes. The reactive macromonomers also need to be soluble in the reaction medium so that they can re-incorporate into growing chains when a solution process is employed. Adequate mixing is also important to ensure proper contact of the reactive macromonomers with the growing backbone molecules. Higher monomer conversion or low monomer concentration in the second polymerization zone is preferred to boost the reactive macromonomer incorporation over monomer insertion. In one embodiment, the monomer conversion in the second polymerization zone is 50% or more, such as 70% or more. In another embodiment, the monomer concentration in the second polymerization zone is 5 mole/liter or less, such as 2 mole/liter or less, such as 1 mole/liter or less, for example 0.5 mole/liter or less.

Another method of enhancing branch block compositions that result from reaction of the macromonomer with the growing backbone, also referred to as cross-products, is to add a chain transfer agent that transfers a vinyl group to the end of the polymer chain while deactivating the catalyst. Such chain transfer agents include, but are not limited to, vinyl chloride, vinyl fluoride, vinyl bromide. In the process, the catalyst is reactivated by the presence of an aluminum alkyl activator such as an alumoxane (typically methylalumoxane).

Suitable conditions for polymerization in each reaction zone include a temperature from about 50° C. to about 250° C., such as from about 50° C. to about 150° C., for example from about 70° C. to about 150° C. and a pressure of 0.1 MPa or more, such as 2 MPa or more. The upper pressure limit is not critically constrained but is typically 200 MPa or less, such as 120 MPa or less, except when operating in supercritical phase then the pressure and temperature are above the critical point of the reaction media in question (typically over 95° C. and 4.6 MPa for propylene polymerizations). For more information on running supercritical polymerizations, see International Patent Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

Where the polymerization is conducted in at least two reaction zones, the temperature employed in the first reaction zone is preferably lower than the temperature employed in the second reaction zone, typically by at least 10° C., such as at least 20° C. In one embodiment, the temperature employed in the first reaction zone is between about 70° C. and about 180° C. and the temperature employed in the second reaction zone is between about 80° C. and about 200° C.

A polymer can be recovered from the effluent of either the first polymerization step or the second polymerization step by separating the polymer from other constituents of the effluent using conventional separation means. For example, polymer can be recovered from either effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Suitable catalysts are those capable of polymerizing a $C_2$ to $C_{20}$ olefin to produce a propylene copolymer. The catalysts employed in the first reaction zone should to able to produce polymers with reactive unsaturated chain ends, preferably at least 50% of vinyl unsaturation based on the total unsaturated olefin chain ends, while the catalyst used in the second reaction zone should be capable of incorporating the polymerizable macromonomer into a growing chain to form branched block polymers. The catalysts can be in the form of a homogeneous solution, supported, or a combination thereof. A wide variety of transition metals compounds are known that, when activated with a suitable activator, will polymerize alpha-olefins selectively to produce either crystalline polymers or amorphous polymers. For a full discussion of such compounds reference is directed to International Patent Publication No. WO 2004/046214, published Jun. 3, 2004, the entire contents of which are incorporated herein by reference.

Preferably propylene homopolymer and semi-crystalline copolymer are made with a polymerization catalyst, such as an activated metallocene catalyst, which forms essentially or substantially isotactic propylene sequences.

Suitable metallocene catalysts capable of producing crystalline poly-alpha-olefins, such as crystalline propylene homopolymers and semi-crystalline propylene copolymers, include those obeying the following general formula (1):

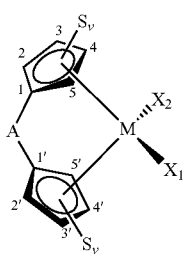

Formula (1)

wherein
M is a Group 3, 4, 5 or 6 transition metal atom, or a lanthanide metal atom, or actinide metal atom, preferably a Group 4 transition metal atom selected from titanium, zirconium or hafnium; each cyclopentadienyl (Cp) ring is substituted with from zero to four substituent groups $S_v$, each substituent group $S_v$ being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent $S_v$ groups may be joined to form a $C_4$ to $C_{20}$ ring to give a saturated or unsaturated polycyclic ligand, wherein the subscript "v" denotes the carbon atom on the Cp-ring to which the substituent is bonded; A is a bridging group; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Conveniently, A is a bridging group containing boron or a Group 14, 15 or 16 element. Examples of suitable bridging groups include $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R'_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C-BR'$, $R'_2C-BR'-CR'_2$, $R'N$, $R'P$, O, S, Se, $R'_2C-O-CR'_2$, $R'_2CR'_2C-O-CR'_2CR'_2$, $R'_2C-O-CR'_2CR'_2$, $R'_2C-O-CR'=CR'$, $R'_2C-S-CR'_2$, $R'_2CR'_2C-S-CR'_2CR'_2$, $R'_2C-S-CR'_2CR'_2$, $R'_2C-S-CR'=CR'$, $R'_2C-Se-CR'_2$, $R'_2CR'_2C-Se-CR'_2CR'_2$, $R'_2C-Se-CR'_2CR'_2$, $R'_2C-Se-CR'=CR'$, $R'_2C-N=CR'$, $R'_2C-NR'-CR'_2$, $R'_2C-NR'-CR'_2CR'_2$, $R'_2C-NR'-CR'=CR'$, $R'_2CR'_2C-NR'-CR'_2CR'_2$, $R'_2C-P=CR'$, and $R'_2C-PR'-CR'_2$ where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group A include $CH_2$, $CH_2CH_2$, $CH(CH_3)_2$, O, S, $SiMe_2$, $SiPh_2$, $SiMePh$, $Si(CH_2)_3$ and $Si(CH_2)_4$.

Preferred transition metal compounds for producing poly-alpha-olefins having enhanced isotactic character are those of formula 1 where the $S_v$ groups are independently chosen such that the metallocene framework 1) has no plane of symmetry containing the metal center, and 2) has a $C_2$-axis of symmetry through the metal center. These complexes, such as rac-$Me_2Si(indenyl)_2ZrMe_2$ and rac-$Me_2Si(indenyl)_2HfMe_2$, are well known in the art and generally produce isotactic polymers with high degrees of stereoregularity. Similarly another preferred class of transition metal compounds that can produce isotactic polymers useful herein is the monocyclopentadienyl catalysts disclosed in U.S. Pat. No. 5,026,798, which is incorporated by reference herein. A detailed description of suitable catalyst compounds and catalyst selections may be found in U.S. Published Patent Application No. 2004/0217614, published Jul. 1, 2004, which is incorporated by reference herein.

Similarly, transition metal compounds providing tacticity control exist where the $S_v$ substituents of sufficient steric bulk to restrict rotation of the cyclopentadienyl ligands such that the aforementioned symmetry conditions are satisfied. Preferable chiral racemic metallocenes of this type include bis (tricyclo[5.2.1.0$^{2,6}$]deca-2,5-dienyl)zirconium and -hafnium dimethyl, bis((1R)-9,9-dimethyltricyclo[6.1.1.0$^{2,6}$]deca-2,5-dienyl) zirconium dimethyl, bis(tricyclo[5.2.1.0$^{2,6}$]deca-2,5, 8-trienyl) zirconium dimethyl, bis(tricyclo[5.2.2.0$^{2,6}$]undeca-2,5,8-trienyl)zirconium and hafnium dimethyl and bis ((1R,8R)-7,7,9,9-tetramethyl[6.1.1.0$^{2,6}$]deca-2,5-dienyl) zirconium and hafnium dimethyl.

Particularly preferred transition metal compounds for producing crystalline poly-alpha-olefins are racemic metallocenes, such as rac-dimethylsiladiyl(2-isopropyl,4-phenyl-indenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl] indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl, 4-phenylindenyl)zirconium dichloride, rac dimethylsiladlyl bis-(2-methyl, 4-napthylindenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride and rac-biphenyl siladiyl(2-isopropyl, 4-[3,5 di-t-butyl-phenyl]indenyl)$_2$ zirconium dichloride. Alkylated variants of these metallocenes (e.g. di-methyl instead of dichloride) are also contemplated, dictated by the choice of catalyst activation system. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

Suitable transition metal compounds for the production of poly-alpha-olefins having enhanced syndiotactic character are those of formula 1 where the $S_v$ ligands are independently chosen such that the Cp ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the Cp ligands that renders each to be symmetrical with respect to the bridging group A but different with respect to each other thereby controlling the approach of each successive monomer unit that is added to the polymer chain. The steric difference between the Cp ligands acts to block the approaching monomer from a random approach such that the monomer is added to the polymer chain in the syndiotactic configuration.

Preferable transition metal compounds for the production of syndiotactic polymers are those of formula 1 where the $S_v$ substituents on the Cp ligand are independently chosen such that 1) the steric difference between the Cp ligands is maximized and 2) there remains a plane of symmetry through the metal center and the $C_1$ and $C_{1'}$ carbon atoms of the Cp-rings in formula 1. Thus, complexes such as Me$_2$C($\eta^5$-C$_5$H$_4$)(1-fluorenyl)MMe$_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5,10,10,11,11-octahydrodibenzo[b,h]fluorene. Because pre-catalysts of this type often lose their ability to control the stereoregularity of the polymer under high temperature reaction conditions, to insure higher crystallinity in the material requires using these catalysts at lower reactor temperatures, preferably at temperatures below 80° C.

The preferred choice of transition metal compounds for producing the amorphous polymer fraction are mono-cyclopentadienyl transition metal compounds obeying the formula (2):

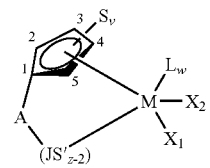

Formula (2)

wherein M is a Group 3, 4, 5 or 6 transition metal atom, or a lanthanide metal atom, or actinide metal atom, preferably a Group 4 transition metal atom selected from titanium, zirconium or hafnium; $S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); (JS'$_{z-2}$) is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J; A is a bridging group as defined above; $X_1$ and $X_2$ are the same as in formula 1; L is an olefin, diolefin, aryne, amine, phosphine, ether, or sulfide ligand, or any other neutral Lewis base; provided L can also be a second transition metal compound of the same type such that the two metal centers M and M* are bridged by $X_1$ and $X'_1$, wherein M* has the same meaning as M, $X'_1$ has the same meaning as $X_1$, and w is an integer from 0 to 3.

"Symmetrically substituted" in relation to the S ligands in formula (2) is defined to mean that the cyclopentadienyl ring is substituted in the 2 and 5 positions and/or 3 and 4 positions with $S_v$ groups that are of approximately of the same steric bulk. Typically the size of these $S_v$ groups is within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs is of similar steric bulk. Additionally, two adjacent $S_v$ groups in the 3 and 4 position may be linked to form a ring provided that the new ring is also symmetrically substituted.

Catalyst systems including transition metal compounds of the type defined by formula (2) are known to impart 2,1-mistakes when incorporating C3 and higher alpha-olefins. The compounds where S' is bonded to a nitrogen ligand (J) via a tertiary carbon (for example when S' is tert-butyl or 1-adamantyl) have fewer 2,1-mistakes then when S' is bonded to the nitrogen ligand (J) via a primary carbon (for example when S' is n-butyl, methyl, or benzyl) or secondary carbon (for example when S' is cyclododecyl, cyclohexyl, or sec-butyl). The 2,1-mistakes in the polymer backbone impart $(CH_2)_2$ units that can be beneficial to the polymer properties. Polymers of this type, the characterization of such polymers and the catalyst systems used to produce such polymers are described in U.S. Pat. No. 5,723,560, which is incorporated herein by reference. Lower Mw versions of such polymers can be produced by changing process condition, for example, by increasing reactor temperature.

Illustrative, but not limiting examples of preferred mono-cyclopentadienyl metallocenes of the type described in formula (2) above are:

μ-$(CH_3)_2$Si(cyclopentadienyl)(1-adamantylamido)M(R)$_2$
μ-$(CH_3)_2$Si(3-tertbutylcyclopentadienyl)(1-adamantylamido)M(R)$_2$
μ-$(CH_3)_2$Si(tetramethylcyclopentadienyl)(1-adamantylamido)M(R)$_2$
μ-$(CH_3)_2$C(tetramethylcyclopentadienyl)(1-adamantylamido)M(R)$_2$
μ-$(CH_3)_2$Si(tetramethylcyclopentadienyl)(1-tertbutylamido)M(R)$_2$
μ-$(CH_3)_2$Si(fluorenyl)(1-tertbutylamido)M(R)$_2$
μ-$(CH_3)_2$Si(tetramethylcyclopentadienyl)(1-cyclododecylamido)M(R)$_2$
μ-$(CH_3)_2$C(tetramethylcyclopentadienyl)(1-cyclododecylamido)M(R)$_2$ wherein M is selected from a group consisting of Ti, Zr, and Hf and wherein R is selected from $C_1$ and $CH_3$.

Additionally, some catalysts that produce syndiotactic poly-alpha-olefin at lower temperatures, will produce virtually non-crystalline poly-alpha-olefins at higher temperatures. Preferred transition metal compounds of this type are illustrated in formula (3):

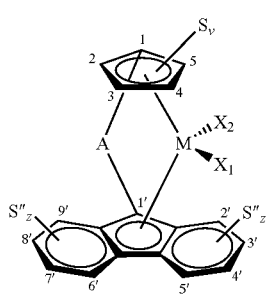

Formula (3)

wherein M is a Group 3, 4, 5 or 6 transition metal atom, or a lanthanide metal atom, or actinide metal atom, particularly a Group 4 transition metal atom selected from titanium, zirconium or hafnium; $S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$ to $C_{20}$ ring to give a saturated or unsaturated polycyclic ligand; subscript "z" denotes the carbon atom on the fluorenyl ring to which the substituent is bonded and where there can be zero to seven substituents, S", on the fluorenyl ring; and A is a bridging group as defined above "Symmetrically substituted" in relation to the $S_v$ ligands in formula (3) is defined to mean that the cyclopentadienyl ring is substituted in the 2 and 5 positions and/or 3 and 4 positions with $S_v$ groups that are of approximately of the same steric bulk. Typically the sizes of these $S_v$ groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs are of similar steric bulk. Additionally, two adjacent $S_v$ groups in the 3 and 4 position may be linked to form a ring provided that the new ring is also symmetrically substituted.

Preferably metallocene precursors for producing poly-alpha-olefins having largely amorphous character (when used as catalysts under higher reactor temperature conditions) are those of formula (3) where $S_v$ are independently chosen such that the metallocene framework has a plane of symmetry containing the metal center and bisecting the Flu- and Cp-rings. The bridging group A need not be symmetrical—for example dimethylsilyl or methylphenylsilyl will not effect the stereochemistry of the polymer produced. Because of the distant placement of the S" substituents on the fluorenyl ring, these substituents need not be symmetrically placed on the fluorenyl ring. Hence, the fluorenyl ring may be substituted with up to 7 substituents that may be the same or different.

Illustrative, but not limiting examples of preferred unsymmetrical cyclopentadienyl metallocenes of the type described in formula (3) above for the invention are:

μ-$(C_6H_5)_2$C(cyclopentadienyl)(fluorenyl)M(R)$_2$
μ-$(C_6H_5)_2$C(3-methylcyclopentadienyl)(fluorenyl)M(R)$_2$
μ-$(CH_3)_2$C(cyclopentadienyl)(fluorenyl)M(R)$_2$
μ-$(C_6H_5)_2$C(cyclopentadienyl)(2-methylindenyl)M(CH$_3$)$_2$
μ-$(C_6H_5)_2$C(3-methylcyclopentadienyl)(2-methylindenyl)M(Cl)$_2$
μ-(p-triethylsilylphenyl)$_2$C(cyclopentadienyl)(3,8-di-t-butylfluorenyl) M(R)$_2$
μ-$(C_6H_5)_2$C(cyclopentadienyl)(2,7-dimethylindenyl)M(R)$_2$
μ-$(CH_3)_2$C(cyclopentadienyl)(2,7-dimethylindenyl)M(R)$_2$.

wherein M is chosen from the group consisting of Zr and Hf and R is chosen from the group consisting of $C_1$ and $CH_3$.

Additionally, compounds of formula (4) may be used to produce the amorphous polymer component:

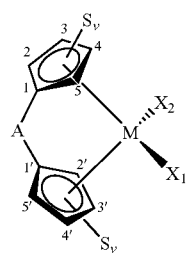

Formula (4)

wherein M is a Group 3, 4, 5 or 6 transition metal atom, or a lanthanide metal atom, or actinide metal atom, preferably a Group 4 transition metal atom selected from titanium, zirconium or hafnium; $S_v$ is the same as in formula 1 where the subscript "v" denotes the carbon atom on each cyclopentadienyl ring to which the substituent is bonded and where there can be zero to four substituents, $S_v$, on each cyclopentadienyl ring provided that the cyclopentadienyl rings are symmetrically substituted (as defined below); and A, $X_1$ and $X_2$ are the same as defined in formula 1.

"Symmetrically substituted" in relation to the $S_v$ ligands in formula (4) is defined to mean that the metallocene framework has a plane of symmetry that bisects M and A. Thus, where the cyclopentadienyl rings include substituents, they should be substituted in the 2 and 2' positions and/or 3 and 3' positions and/or 4 and 4' positions and/or 5 and 5' positions with S groups that are of approximately of the same steric bulk. Typically the sizes of these $S_v$ groups are within 2 carbons of each other. Thus cyclopentadienyl rings substituted at the 2 and the 2' positions with methyl and ethyl respectively, or substituted at the 3 and the 3' positions with hexyl and octyl respectively, would be considered symmetrical. Likewise, the cyclopentadienyl rings may be substituted at all four sites with $S_v$ groups and be considered symmetrical as long as each of the symmetrical pairs are of similar steric bulk. Additionally, two adjacent $S_v$ groups may be linked to form a ring provided that the new ring is also symmetrically substituted.

Illustrative, but not limiting examples of preferred transition metal compounds of formula (4) are the racemic isomers of:

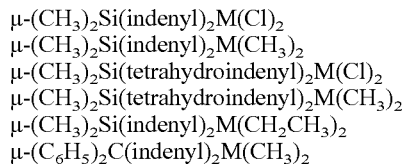

wherein M is chosen from a group consisting of Zr and Hf.

The transition metal compounds described above are typically activated in various ways to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

Alumoxanes may be produced by the hydrolysis of the respective trialkylaluminum compound. MMAO may be produced by the hydrolysis of trimethylaluminum and a higher trialkylaluminum such as tri-iso-butylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European Publications EP-A-0 561 476, EP-B-0 279 586, EP-A-0 594-218 and EP-B1-0 586 665, and PCT Publication Nos. WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, and disclosed in U.S. Pat. No. 5,041,584).

In addition to or in place of alumoxanes, the transition metal compounds described herein can be activated using ionizing or stoichiometric activator, neutral or ionic, such as tri (n-butyl) ammonium tetrakis (pentafluorophenyl) boron, a trisperfluorophenyl boron metalloid precursor or a trisperfluoronapthyl boron metalloid precursor, polyhalogenated heteroborane anions (WO 98/43983), boric acid (U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference. Ionic catalysts can be preparedly reacting a transition metal compound with a neutral Lewis acid, such as $B(C_6F_6)_3$, which upon reaction with the hydrolyzable ligand (X) of the transition metal compound forms an anion, such as ([B $(C_6F_5)_3$ (X)]$^-$), which stabilizes the cationic transition metal species generated by the reaction.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

$$(L\text{-}H)_d^+(A^{d-})$$

wherein L is an neutral Lewis base; H is hydrogen; (L-H)$^+$ is a Bronsted acid; $A^{d-}$ is a non-coordinating anion having the charge d−; and d is an integer from 1 to 3.

The cation component, (L-H)$_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component, $A^{d-}$, may include an anion having the formula $[M^{k+}Q_n]^{d-}$ wherein k is an integer from 1 to 3; n is an integer from 2-6; n−k=d; M is an element selected from Group 13 of the Periodic Table of the Elements, particularly boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of the ionic stoichiometric activator (L-H)$_d^+$ ($A^{d-}$) is N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion may be employed, such as is described in EP-A-0 426 637, EP-A-0 573 403 and U.S. Pat. No. 5,387,568, which are all herein incorporated by reference. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in the present process are those that are compatible, stabilize the metallocene cation in the sense of balancing its ionic charge at +1, yet retain sufficient lability to permit displacement by an ethylenically or acetylenically unsaturated monomer during polymerization. These types of cocatalysts sometimes use tri-isobutyl aluminum or tri-octyl aluminum as a scavenger.

The polymerization process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

When two transition metal compound based catalysts are used in one reactor as a mixed catalyst system, the two transition metal compounds should be chosen such that the two are compatible. A simple screening method such as by $^1$H or $^{13}$C-NMR, known to those of ordinary skill in the art, can be used to determine which transition metal compounds are compatible.

It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The catalyst systems used to produce the present copolymer may also include a support material or carrier. For example, the one or more catalyst components and/or one or more activators may be deposited on, contacted with, vaporized with, bonded to, or incorporated within, adsorbed or absorbed in, or on, one or more supports or carriers. The support material may be any of the conventional support materials. Preferably the support material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Typical support materials are inorganic oxides that include those Group 2, 3, 4, 5, 13 or 14 metal oxides, such as silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

When present, the support material typically has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 $m^2/g$, pore volume from about 0.8 to about 3.0 cc/g and average particle size is from about 5 to about 100 μm. The average pore size of the support material is typically in the range of from 10 to 1000 Å, preferably 50 to about 500 Å, and most preferably 75 to about 350 Å.

As is well known in the art, the catalysts may also be supported together on one inert support, or the catalysts may be independently placed on two inert supports and subsequently mixed. Of the two methods, the former is preferred.

Additives

The in-reactor polymer blend described herein may optionally be combined with one or more polymer additives known in the art, such as reinforcing and non-reinforcing fillers, scratch resistant agents, plasticizers, antioxidants, stabilizers, extender oils, lubricants, antiblocking agents, antistatic agents, waxes, foaming agents, pigments, flame retardants and other processing aids known in the rubber compounding art. Such additives may comprise up to about 70 weight percent, more preferably up to about 65 weight percent, of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The oils are selected from those ordinarily used in conjunction with the specific rubber or rubber component present in the composition.

The additives such as fillers and oils can be introduced into the in-reactor polymer blend during the polymerization in either the first polymerization zone or the second polymerization zone. The additives can be added into the effluent from the second polymerization zone but are preferably added into the polymer blend after removal of solvent or diluent through melt blending.

Additional polymers can also be added to form blends. In one or more embodiments, the additional polymers include thermoplastic resins or thermoplastic elastomers. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another α-olefin such as 1-butene, 1-hexene, i-octene, 2-methyl-1-propene, 3-methyl-1-pentene, 4-methyl-1-pentene, 5-methyl-1-hexene or mixtures thereof are also contemplated. Specifically included are the homo-polypropylene, impact, and random copolymers of propylene with ethylene or the higher α-olefins, described above. Preferably, the homopolypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight (Mw) of at least 50,000 g/mol, alternatively at least 100,000 g/mol. Comonomer contents for these propylene copolymers will typically be from 1 to about 30% by weight of the polymer (See, for example, U.S. Pat. Nos. 6,268,438, 6,288,171, and 6,245,856. Copolymers available under the trade name VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Uses of the In-Reactor Polymer Blends

The in-reactor polymer blends described herein may be shaped into desirable end use articles by any suitable means known in the art. They are particularly useful for making articles by injection molding, blow molding, film blowing, extrusion, thermoforming, gas foaming, elasto-welding and compression molding techniques.

The invention will now be more particularly described with reference to the accompanying non-limiting Examples.

In the Examples, peak melting point (Tm) and peak crystallization temperature (Tc), glass transition temperature (Tg), and heat of fusion were determined using the following procedure according to ASTM D3418-03. Differential scanning calorimetric (DSC) data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, and then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the degree of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B were obtained from the Polymer Handbook, Fourth Edition, published by John Wiley and Sons, New York 1999. A value of 189 J/g (B) was used as the heat of fusion for 100% crystalline polypropylene. A value of 290 J/g is used for the heat of fusion for 100% crystalline polyethylene. The melting and crystallization temperatures reported here were obtained during the second heating/cooling cycle.

For polymers displaying multiple endothermic and exothermic peaks, all the peak crystallization temperatures and peak melting temperatures were reported. The heat of fusion for each endothermic peak was calculated individually. The percent of crystallinity is calculated using the sum of heat of fusion from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period up to about 2 days) or annealed to maximize the level of crystallinity.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was ~4 N/m with a resonance frequency of ~70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm$^{-1}$ to 4000 cm$^{-1}$ was recorded and the area under propylene band at ~1165 cm$^{-1}$ and the area of ethylene band at ~732 cm$^{-1}$ in the spectrum were calculated. The baseline integration range for the methylene rocking band is nominally from 695 cm$^{-1}$ to the minimum between 745 and 775 cm$^{-1}$. For the polypropylene band the baseline and integration range is nominally from 1195 to 1126 cm$^{-1}$. The ethylene content in wt. % was calculated according to the following equation:

ethylene content (wt. %)=72.698−86.495$X$+13.696$X^2$ where $X$=AR/(AR+1) and AR is the ratio of the area for the peak at ~1165 cm$^{-1}$ to the area of the peak at ~732 cm$^{-1}$.

Molecular weights (number average molecular weight (Mn), weight average molecular weight (Mw), and z-average molecular weight (Mz)) were determined using a Polymer Laboratories Model 220 high temperature SEC with on-line differential refractive index (DRI), light scattering, and viscometer detectors. It used three Polymer Laboratories PLgel 10 m Mixed-B columns for separation, a flow rate of 0.54 cm$^3$/min, and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45° C., 90° C., and 135° C. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Branching index in the Examples was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l$=KM$_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing $C_2$ to $C_{10}$ monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comonomer is C9 or more, one can refer to T. Sun, P. Brant, R. R. Chance, and W.

W. Graessley, *Macromolecules*, Volume 34, Number 19, 6812-6820, (2001) for protocols on determining standards for those polymers. In the case of syndiotactic polymers, the standard should have a comparable amount of syndiotacticty as measured by Carbon 13 NMR. The viscosity averaged g' was calculated using the following equation:

$$g'_{vis} = \frac{\sum C_i [\eta_i]_b}{\sum C_i K M_i^\alpha}$$

where $C_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and $\alpha$ are as defined above.

In conducting the C13 NMR investigations, samples are prepared by adding about 0.4 g sample to approximately 3 g of a 50/50 mixture of tetrachloroethane-d2/orthodichlorobenzene in a 10 mm NMR tube. The samples are dissolved and homogenized by heating the tube and its contents to 150° C. The data are collected using a Varian Unity Plus® 400 MHz spectrometer, corresponding to a $^{13}C$ resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Temperature rising elution fractionation (TREF) analysis is conducted using Polymer Char TREF 200 (PolymerChar, Valencia, Spain) equipped with an infrared detector according to the method described by Wilde, L.; Ryle, T. R.; Knobeloch, D. C.; Peat, I. R.; Determination of Branching Distributions in Polyethylene and Ethylene Copolymers, J. Polym. Sci., 20, 441-455 (1982). The polymer samples is first dissolved in 1,2 dichlorobenzene with 400 ppm of butylated hydroxy toluene (BHT) at 160° C. for about 60 minutes at a polymer concentration of 2 to 6 mg/mL. The resulting solution is then introduced into a packed column and stabilized at 140° C. for about 45 minutes. The polymer sample is then allowed to crystallize in the packed column by slowly reducing the temperature to 30° C. or 0° C. at a cooling rate of 1° C./min. The sample is then first eluted from the column by pumping the solvent through the column at a flow rate of 1.0 ml/min for 10 minutes at 0° C. or 30° C. A TREF chromatogram curve is then generated by eluting the crystallized polymer sample from the column by slowly increasing the temperature of the eluting solvent from 0° C. or 30° C. to 140° C. at a rate of 2° C./min and eluting solvent flow rate of 1.0 ml/min. The concentration of eluted polymer is measured using the infrared detector.

Crystallization analysis fractionation (CRYSTAF) was conducted using a CRYSTAF 200 unit commercially available from PolymerChar, Valencia, Spain. The sample is dissolved in 1,2 dichlorobenzene at 160° C. at a polymer concentration of about 0.2 to 1.0 mg/ml for about 1 hour and stabilized at 95° C. for about 45 minutes. The sampling temperatures range from 95° C. to 30° C. or 95° C. to 0° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the crystallinity distribution of each polymer components of the in-reactor polymer blends. The CRYSTAF peak temperature and area are identified by the peak analysis module included in the CRYSTAF Software. The CRYSTAF peak finding routine identifies a peak temperature as a maximum in the dW/dT curve and the area between the largest positive inflections on either side of the identified peak in the derivative curve.

Shore hardness was determined according to ASTM D2240.

Brookfield viscosity was measured according the ASTM D3236 using a Brookfield digital viscometer at 190° C.

Stress-strain properties, including ultimate tensile strength, ultimate elongation, and 100% modulus, were determined at room temperature according to ASTM D638 and ASTM D1708 for microtensile specimens. The specimens were cut from compression molded plaques using a mallet handle die. Specimen dimensions were those specified in ASTM D 638 or ASTM D1708. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Initial modulus, stress and strain at yield (where evident), peak stress, tensile strength at break, and strain and elongation at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Toughness is defined as the ability of polymer to absorb applied energy. The area under the stress-strain curve is used as a measure of the toughness.

Melt flow rate (MFR) was determined according to ASTM D1238 using a load of 2.16 kg at 230° C.

Dynamic Mechanical Thermal Analysis (DMTA) examines the behavior of viscoelastic materials according to temperature and frequency dependent behavior. The application of a small stress produces a deformation (strain) in the material. The amount of deformation resulting from the applied stress yields information concerning the moduli of the material; its stiffness and damping properties. The DMTA is a controlled stress instrument applied in a sinusoidal fashion and gives a sinusoidal response versus time. As a consequence of the applied sinusoidal stress the material responds in an elastic (stores energy) and viscous (dissipates energy) manners. DMTA separates these responses into two different moduli values: Elastic Modulus (E') and the loss modulus (E") and in a temperature sweep these moduli is measured from the glassy region, the plateau region to the terminal region. The response of viscoelastic materials is out of phase with the input signal by an angle delta (δ). The tangent of this angle is equal to the ratio E"/E' and it is a valuable indicator of the relative damping ability of the material. Any peak in the tan δ corresponds to a region where the material properties are changing very rapidly; the material is undergoing a transition or relaxation such as Tg (glass transition temperature) and other relaxations.

Dynamic shear melt rheological data was measured with an Advanced Rheometrics Expansion System (ARES) using parallel plates (diameter=25 mm) at several temperatures (150° C., 170° C., 190° C. and 210° C.) using a pristine compression molded sample at each temperature. The measurements were made over the angular frequency ranged from 0.01-100 rad/s. Depending on the molecular weight and temperature, strains of 10% and 15% were used and linearity of the response was verified. A N2 stream was circulated through the sample oven to minimize chain extension or cross-linking during the experiments. All the samples were compression molded at 190° C. and no stabilizers were added. A sinusoidal shear strain is applied to the material if the strain amplitude is sufficiently small the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials 0<δ<90.

Examples 1 to 3

These examples demonstrate the use of a series reactors operated in the continuous stirred-tank solution process employing rac-dimethylsilyl bis(2-methyl-4-phenylindenyl) zirconium dimethyl catalyst (Catalyst A) to produce polypropylene in the first reactor and propylene/ethylene copolymer in the second reactor. The first reactor was 0.5-liter and the second reactor was 1-liter; both of them were stainless steel autoclave reactors and were equipped with a stirrer, a water-cooling/steam-heating element with a temperature controller, and a pressure controller. Solvents, monomers such as ethylene and propylene were first purified by passing through a three-column purification system. Purification columns were regenerated periodically whenever there was evidence of lower activity of polymerization.

The solvent feed to the reactors was measured by a mass-flow meter. A Pulsa feed pump controlled the solvent flow rate and increased the solvent pressure to the reactors. The compressed, liquefied propylene feed was measured by a mass flow meter and the flow was controlled by a Pulsa feed pump. The solvent, monomers were fed into a manifold first. Ethylene from in-house supply was delivered as a gas solubilized in the chilled solvent/monomer mixture in the manifold. The mixture of solvent and monomers were then chilled to about −15° C. by passing through a chiller prior to feeding into the reactor through a single tube. Ethylene flow rate was metered through a Brookfield mass flow controller.

Catalyst A was preactivated with dimethyl anilinium tetrakis(heptafluoro-2-naphthyl) borate at a molar ratio of 1:1 in 900 ml of toluene. All catalyst solutions were kept in an inert atmosphere with <1.5 ppm water content and fed into reactors by metering pumps. Tri-n-octylaluminum (TNOA) solution was used as a scavenger.

The reactors were first cleaned by continuously pumping solvent (e.g., isohexane) and scavenger through the reactor system for at least one hour at a maximum allowed temperature (about 150° C.). After cleaning, the reactors were heated/cooled to the desired temperature using water/steam mixture flowing through the reactor jacket and controlled at a set pressure with controlled solvent flow. Monomers and catalyst solutions were then fed into the reactor. An automatic temperature control system was used to control and to maintain the reactors at set temperatures. Onset of polymerization activity was determined by observations of a viscous product and lower temperature of water-steam mixture. Once the activity was established and system reached steady state, the reactors were lined out by continuing operating the system under the established condition for a time period of at least five times of mean residence time prior to sample collection.

The resulting mixture from the second reactor, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g.

Propylene, isohexane, Catalyst A solution and scavenger solution were all fed into the first reactor. The content of the first reactor flows into the second reactor. Optionally additional propylene and ethylene were fed into the second reactor. The detailed reaction conditions and polymer properties are listed in Table 1. The molecular weights reported in the Table 1 were obtained from a light scattering detector.

TABLE 1

| | Example # | | |
|---|---|---|---|
| | 1 | 2 | 3 |
| Polymerization temperature in the 1st reactor (° C.) | 100 | 100 | 100 |
| Propylene feed rate to 1st reactor (g/min) | 14 | 14 | 14 |
| Isohexane feed rate to 1st reactor (ml/min) | 80 | 80 | 80 |
| Catalyst A feed rate to 1st reactor (mole/min) | 2.83E−08 | 5.67E−08 | 2.83E−08 |
| Polymerization temperature in 2nd reactor (° C.) | 80 | 80 | 80 |
| Propylene feed rate to 2nd reactor (g/min) | 0 | 0 | 0 |
| Ethylene feed rate to 2nd reactor (SLPM) | 2 | 2 | 0.5 |
| Catalyst A feed rate to 2nd reactor (mole/min) | 1.70E−08 | 3.40E−08 | 1.70E−08 |
| Conversion (%) | 20.96 | 96.02 | 87.57 |
| Tc (° C.) | 106.3 | 104.4 | 104.3 |
| Tm (° C.) | 154.9 | 154.6 | 153.9 |
| Tg (° C.) | −33.8 | −38.9 | −21.8 |
| Heat of fusion (J/g) | 50.5 | 48.4 | 24.8 |
| Tm from a secondary melting peak (° C.) | | | 93.9 |
| Heat of fusion from a secondary peak (J/g) | | | 24.4 |
| Ethylene content (wt %) | 10.02 | 10.54 | 5.9 |
| Zero shear viscosity at 190° C. (Pa · s) | 508 | 117 | 153 |
| MFR (dg/min) | 76.2 | 354.8 | 247.4 |
| Mn_LS (kg/mol) | 54.5 | 39.2 | 47.9 |
| Mw_LS (kg/mol) | 109.8 | 103.4 | 108.3 |
| Mz_LS (kg/mol) | 182.8 | 205.7 | 198.7 |
| Tensile strength (MPa) | 15.27 | 16.28 | 29.08 |
| Stress @ break (MPa) | 15.15 | 16.28 | 29.08 |
| Elongation at break (%) | 668.8 | 936.2 | 918.7 |
| Modulus at 100% of elongation (MPa) | 11.0 | 10.19 | 15.04 |

The complex viscosities of the in-reactor polymer blends produced in Examples 1 to 3 were measured at temperatures of 170° C. and 190° C. over a frequency ranging from 0.01 to 100 rad/s. The observed shear thinning is insignificant over the angular frequency range of 0.01 to 100 rad/s. The ratio of complex viscosity at a frequency of 100 rad/s to the zero shear viscosity is 0.56 and 0.65, for materials produced in Example 1 and 2, respectively, when measured at 190° C. The complex viscosity profiles are shown in FIG. 1.

The polymer blends produced in Examples 1 and 2 were analyzed for branched block structures using $^{13}$C-NMR. Both samples had small peaks between 44 and 45 ppm. All three of the peaks identified by Weng, Hu, Dekmezian, and Ruff (Macromolecules 2002, 35, 3838-3845) for long chain branches in isotactic polypropylene were observed at 44.0, 44.7, and 44.8, but were slightly broader than in this reference because of the presence of some ethylene monomers in these samples. The areas of these three peaks were compared with the total area under the spectra to give 0.030 branches per 1000 carbons for Example 1 and 0.058 branches per 1000 carbons for Example 2. These levels of branching are similar to the levels reported by Weng, Hu, Dekmezian, and Ruff for long chain branched iPP (0.072-0.296 per 1000 carbons). There could also be additional carbons near branches adsorbing at different locations in the NMR spectra, which are either unassigned or obscured by other peaks. These long chain branches per 1000 carbons values should be viewed as the minimum amounts present in these examples.

Figure 2:
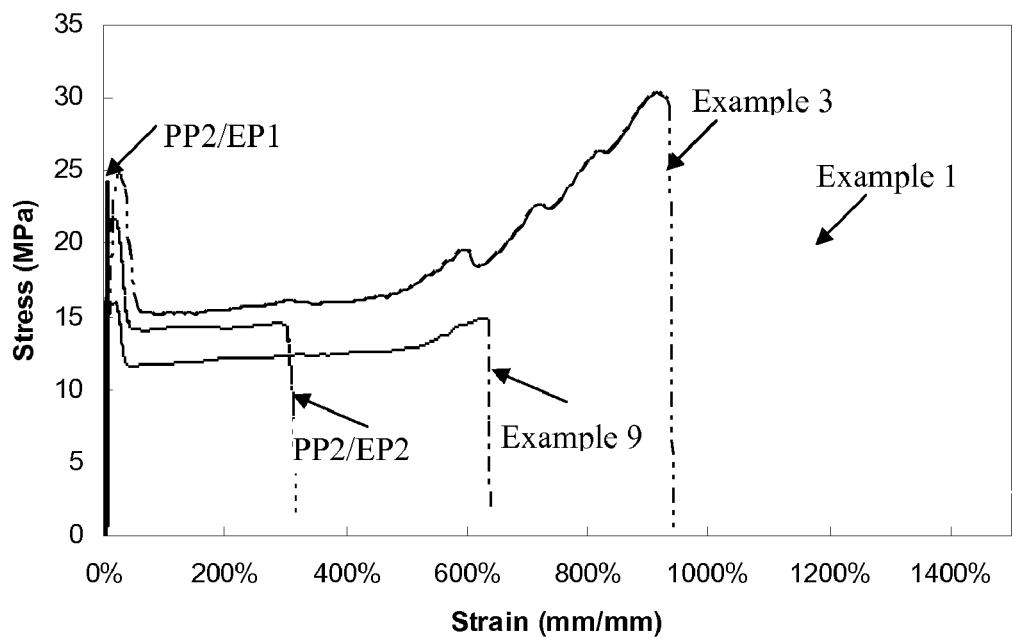
FIG. 2 are stress-strain curves for the in-reactor polymer blends produced in Examples 1, 3 and 9 as well as for the physical blends PP2/EP1 and PP2/EP2 in Comparative Examples 4 to 7.

The polymer blends produced in the Examples 1 to 3 were compressed into plaques for the tensile testing according to the procedure described above. The strain-stress properties of the products are listed in Table 1. The tensile strength of the inventive material is comparable to that of low MFR ICP even though the MFR of the present material is very high. The unusual long elongation at break for such high MFR material was also observed. The strain-stress curves for Examples 1 and 3 are shown in FIG. 2. Strain hardening is observed after the yield point. The present polymer blends have much longer elongation as compared to that of physical blended material of similar composition (See comparative examples below).

Figure 3:
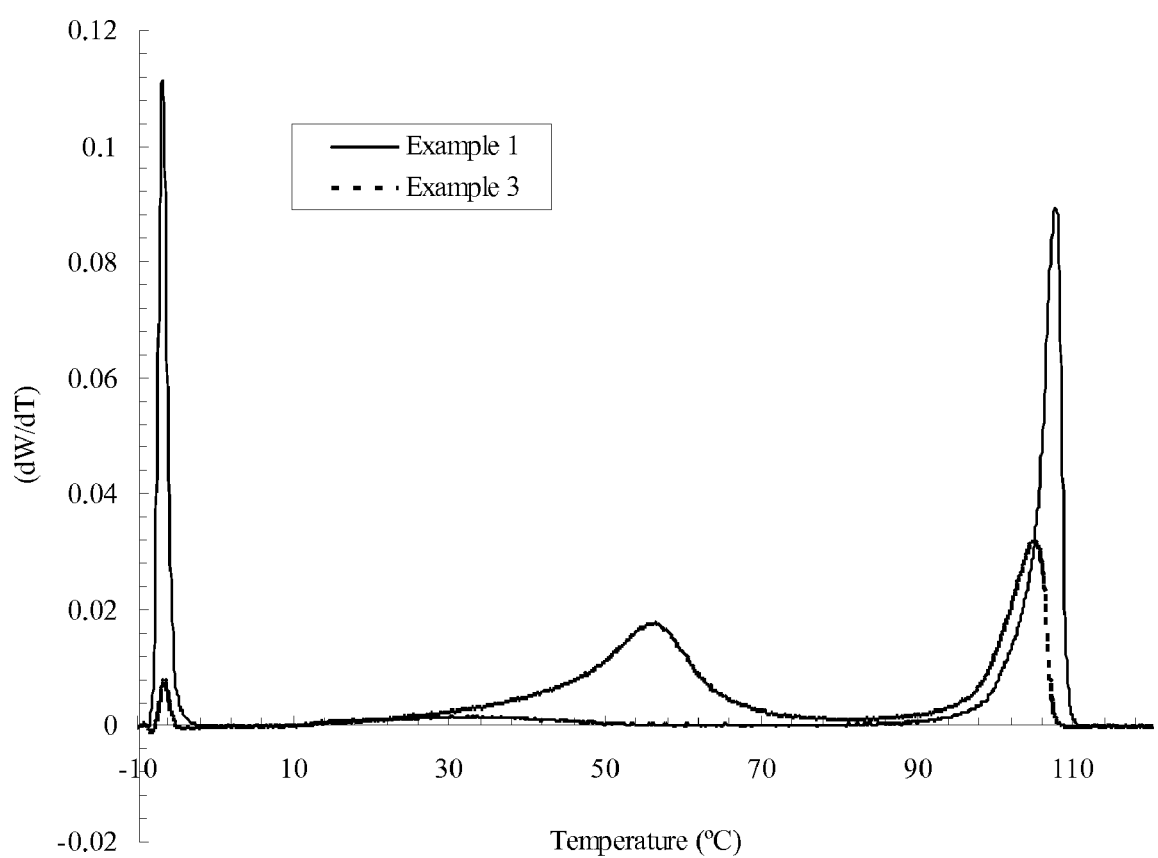
FIG. 3 show TREF traces of dw/dt against elution temperature for the in-reactor polymer blends produced in Examples 1 and 3.

Materials produced in Examples 1 and 2 have a faction eluted between 80° C. to 115° C. and a soluble fraction which elutes below 5° C. when fractionated using TREF according to the procedure described above. The fraction corresponding to the highest temperature peak is referred to as the high-crystalline fraction. The soluble fraction is therefore referred to as amorphous elastomeric component. Material in Example 3 showed three peaks in the TREF trace of dw/dt vs elution temperature. The first fraction eluted between 80° C. and 115° C., the second fraction eluted between 0° C. and 80° C., and a soluble fraction eluted at below 0° C. The fraction eluted between 0° C. and 80° C. is partially due to the presence of semi-crystalline propylene copolymer in the blend and might be shifted depending on the crystallinity of propylene copolymer. TREF traces of dw/dt vs elution temperature for material produced in Examples 1 and 3 are shown in FIG. 3.

The data obtained from DSC for material in Example 1 to 3 are listed in Table 1. For the material produced in Example 3, there is a secondary melting peak in addition to the primary melting peak derived from polypropylene produced in the first reactor.

Figure 4A:
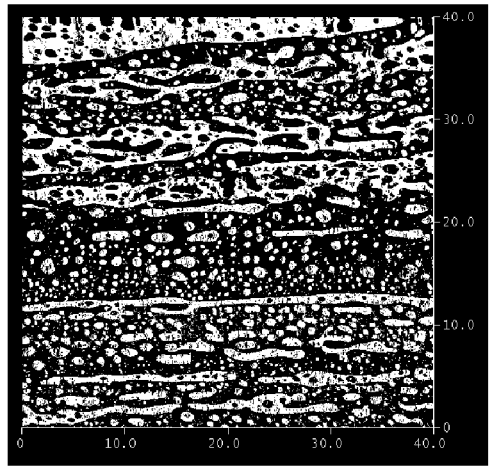
FIGS. 4 (*a*) to (*c*) show atomic force micrographs (AFM) of the polymer blends produced in Example 1 (field of view=40×40 μm), Example 2 (field of view=10×10 μm) and Example 3 (field of view=5×5 μm), respectively.
Figure 4B:
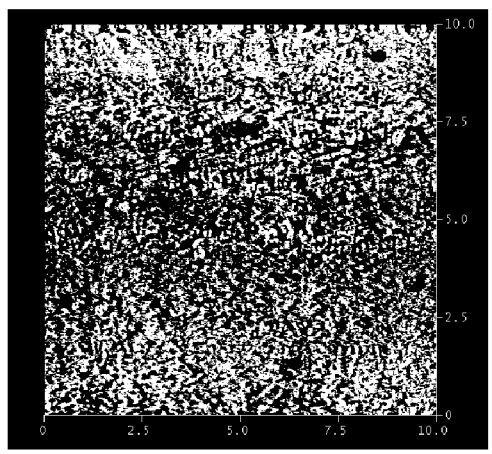
Figure 4C:
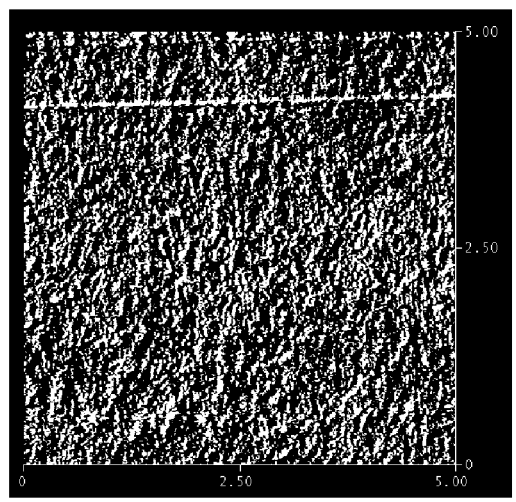

The morphology of each of the blends produced in Examples 1 to 3 was examined using AFM according to the procedure described above and the results are shown in FIG. 4. A heterogeneous morphology was observed for materials produced in the Examples 1 and 2. Most particles of the dispersed phase are less than 3 μm. A homogeneous morphology was observed for material produced in Example 3 since the propylene/ethylene copolymer is compatible with the homo-polypropylene in the in-reactor blend.

Particle size is a good indication of degree of intimate mixing of immiscible polymer blends. Small particle size implies large interfacial contact area between the dissimilar polymers. Evidence of an intimate mixing can be determined by a morphological examination of the polymer blend and is also apparent in the evaluation of the mechanical properties of the mixture. Highly dispersed polymer blends give benefits in impact strength, toughness, and the depression in the ductile to brittle transition temperature of the blends. Another novel feature of the present material is the high degree of intimate mixing between the first and the second polymer components. The intimate mixing is achieved without aid of a compatibilizer.

Examples 4 to 7

Comparative

A series of physical blends of polypropylene and propylene/ethylene copolymers were produced. The polymers for the physical blends were chosen to be approximate replicas of the components of the in-reactor blends of Examples 1 to 3. The weight proportion of the components in the physical blends is similar to that of the in-reactor produced polymer blends. Two homo-polypropylene samples and two propylene/ethylene copolymer samples were made using a similar polymerization procedure described in Examples 1 to 3 except that a single catalyst system was used in a single polymerization reactor. The polymerization was carried out at the same reaction temperature and similar monomer concentration with the same catalyst system to ensure that the physical blend had the same component characteristics as the in-reactor blends. The properties of these polymers are listed in Table 2.

TABLE 2

Molecular weight and composition of materials for physical blending

| | Polymer No. | | | |
|---|---|---|---|---|
| | EP1 | EP2 | PP1 | PP2 |
| Mn_DRI (kg/mol) | 25.1 | 22.1 | 35.2 | 55.9 |
| Mw_DRI (kg/mol) | 75.6 | 54.4 | 81.6 | 137.1 |
| Mz_DRI (kg/mol) | 144.5 | 97.7 | 145.1 | 258.7 |
| g'vis | 0.8 | 0.8 | 0.9 | 0.9 |
| Tc (° C.) | 68.3 | 43.6 | 109.8 | 111.1 |
| Tm (° C.) | 111.4 | 81.4 | 150.8 | 153.4 |
| Tg (° C.) | −13.4 | | | |
| Heat of fusion (J/g) | 60.3 | 34.2 | 106.7 | 107.1 |
| Ethylene content (wt %) | 4.7 | 11.47 | 0 | 0 |
| Brook field viscosity @190° C. (mPa · s) | | | 12350 | 77500 |

The comparative physical blends were made by blending preformed polymer components of the similar composition and molecular weight as in the in-reactor blends in a Brabender (Available from C. W. Brabender Instrument, Inc., South Hackensack, N.J.). The samples were first mixed in a Brabender melt mixer with ~45 mL mixing head. The polymer was stabilized with IRGANOX B 225 antioxidant (available from Ciba Corporation, Tarrytown, N.Y.) during mixing in the Brabender. The Brabender was operated at 60 rpm and at temperature of 230° C. Mixing time at temperature was about 5 minutes, after which the sample was removed from the mixing chamber. The homogenized samples were molded under compression into plaques on a Carver hydraulic press for analysis.

The blend in Example PP1/EP1 was too brittle and was broken during tensile test. The specimen in Example PP1/EP1 and PP2/EP1 broke when the crystal structures in polypropylene phase break down so their elongations at break are less than 15%. Blend of PP2/EP2 has an elongation at break of 285% (still significantly lower than the elongation of the inventive polymer blend); however the stress is rapidly reduce from the peak stress of 21.5 MPa at the yield point to 13.8 MPa at 100% of elongation. No strain hardening was observed. The data of tensile properties for the physical blends are listed in Table 3. The Strain-Stress curve for blends of PP2/EP1 and PP2/EP2 are shown in FIG. 2. The toughness, as measured by the area under the strain-stress curve, for these physical blends is much less than that of the in-reactor products of the present invention.

TABLE 3

|  | Example # | | | |
|---|---|---|---|---|
|  | PP1/EP1 | PP1/EP2 | PP2/EP1 | PP2/EP2 |
| PP1 (wt. %) | 49.85 | 49.85 | 0 | 0 |
| PP2 (wt. %) | 0 | 0 | 49.85 | 49.85 |
| EP1 (wt. %) | 49.85 | 0 | 49.85 | 0 |
| EP2 (wt. %) | 0 | 49.85 | 0 | 49.85 |
| B225 (wt. %) | 0.3 | 0.3 | 0.3 | 0.3 |
| Tc (° C.) | 106.2 | 113.9 | 108.8 | 108.2 |
| Tm (° C.) | 155.3 | 151.4 | 157.5 | 157.4 |
| Tg (° C.) | −15.9 | −26.7 |  | −24.3 |
| Heat of fusion (J/g) | 78.9 | 48.5 | 79.9 | 50.4 |
| Tm from a secondary peak (° C.) | 115.1 |  | 119 |  |
| Elongation at break (%) |  | 12.9 | 6.4 | 285 |
| Tensile strength (MPa) |  | 19.8 | 21.8 | 21.5 |
| Modulus at 100% of elongation (MPa) |  |  |  | 13.8 |

Examples 8 to 10

In these three in-reactor polymer blends, low crystalline propylene/ethylene copolymer was produced in a first reactor, and higher crystalline propylene/ethylene copolymer was produced in a second reactor. The polymerization catalyst and procedure was the same as that used in Examples 1-3 except that ethylene was fed into the first reactor and additional propylene was fed into the second reactor. The crystallinity of the polymer produced in the second reactor was controlled through adjustment of ethylene conversion in the first reactor and addition of propylene into the second reactor. Detailed conditions and some characterization data are listed in Table 4. The molecular weights listed in Table 4 were obtained from a light scattering detector.

TABLE 4

|  | Example # | | |
|---|---|---|---|
|  | 8 | 9 | 10 |
| Polymerization temperature in 1st reactor (° C.) | 80 | 70 | 80 |
| Propylene feed rate to 1st reactor (g/min) | 14 | 14 | 14 |
| Ethylene feed rate to 1st reactor (SLPM) | 2 | 2 | 2 |
| Isohexane feed rate to 1st reactor (ml/min) | 80 | 80 | 80 |
| Catalyst A feed rate to 1st reactor (mole/min) | 8.5E−08 | 8.5E−08 | 8.5E−08 |
| Polymerization temperature in 2nd reactor (° C.) | 100 | 100 | 100 |
| Propylene feed rate to 2nd reactor (g/min) | 10.2 | 10.2 | 10.2 |
| Catalyst A feed rate to 2nd reactor (mole/min) | 3.23E−08 | 0 | 0 |
| Conversion (%) | 99 | 95.59 | 90.87 |
| Tc (° C.) | 102.3 | 100.4 | 104.2 |
| Tm (° C.) | 147.3 | 145.1 | 140.7 |
| Tg (° C.) | −25.6 | −27.8 | −25.9 |
| Heat of fusion (J/g) | 38.7 | 34.8 | 33.4 |
| Tc from secondary peak (° C.) | 54.3 | 49.1 | 51.7 |
| Tm from secondary peak (° C.) | 73.6 | 69.6 | 73.1 |
| Heat of fusion from secondary peak (J/g) | 6.6 | 8.2 | 10.6 |
| Ethylene content (wt %) | 5.86 | 7.06 | 7.27 |
| Zero shear viscosity at 170° C. (Pa · s) | 56.1 | 42.2 | 15.69 |
| MFR (dg/min) | 680.5 | 689 | 639.3 |
| Mn_LS (kg/mol) | 35.3 | 41.9 | 28.9 |
| Mw_LS (kg/mol) | 91.7 | 83.1 | 57.2 |
| Mz_LS (kg/mol) | 188.3 | 150.6 | 106.9 |
| Tensile strength (MPa) | 18.14 | 16.06 | 14.55 |
| Stress @ break (MPa) | 13.77 | 14.41 | 10.45 |
| Elongation at break (%) | 548.08 | 652.87 | 454.95 |
| Modulus at 100% elongation (MPa) | 12.56 | 11.64 | 10.14 |

The complex viscosity of the in-reactor polymer blends produced in Examples 8 to 10 are in the range from 14 to 60 Pa·s when measured at a temperature of 170° C. and an angular frequency of 0.01 rad/s. The shear thinning measured by the complex viscosity is insignificant when the angular frequency varied from 0.01 to 100 rad/s. The ratio of complex viscosity at a frequency of 100 rad/s to the zero shear viscosity at 170° C. is 0.81, 0.87 and 0.0.92 for materials produced in Examples 8 to 10, respectively. The complex viscosity profiles are shown in FIG. 1.

The polymer blends produced in the Examples 8 to 10 were compressed into plaques for the tensile testing according to the procedure described above. The strain-stress properties of the products are listed in Table 4. Both high tensile strength and long elongation were observed. It is surprising to see such high tensile and elongation properties for polymers having such high MFR. The strain-stress curve for Example 9 is shown in FIG. 2. Strain hardening is observed after the yield point. The polymer blends of Examples 8 to 10 have much longer elongation as compared to that of physical blended material of similar composition (See comparative examples above).

Figure 5:
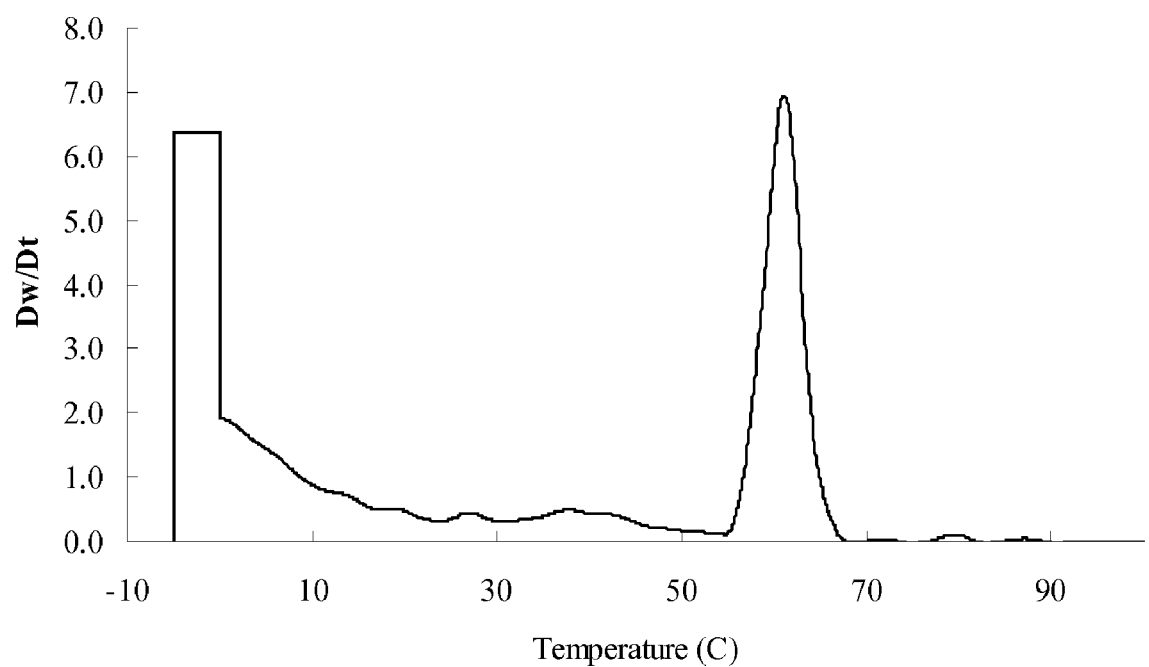
FIG. 5 is a crystallization analysis fractionation (CRYSTAF) chart for the in-reactor polymer blend produced in Example 9.

Materials produced in Examples 8 and 9 have a faction eluted between 55° C. to 80° C. and a fraction span over a broad temperature range from about 50° C. to below −10° C. with a peak around 0° C. when fractionated using CRYSTAF according to the procedure described above. The fractionation revealed that the in-reactor polymer blend consists of at least two propylene copolymers with different crystallinity. The peak temperatures will be shifted depending on the crystallinity of propylene copolymer. A chart of the CRYSTAF for polymer produced in Example 9 is shown in FIG. 5.

The data obtained from DSC for material in Example 8 to 10 are listed in Table 4. All of these materials show a secondary melting peak and a secondary crystallization peak in addition to a primary melting peak and a primary crystallization peak derived from high crystallinity propylene copolymer produced in the second reactor.

The in-reactor polymer blend produced in Example 10 was fractionated using xylene at 82° C. for about 48 hours according to the procedure described above. The soluble fraction was separated by filtering using #3 paper filter under vacuum. This sample had 43.4 wt. % of xylene soluble fraction and 56.6 wt. % of xylene insoluble fraction. Both of the fractions were analyzed using DSC and the results are listed in Table 5.

TABLE 5

Data from DSC for fractionated components of Example 10

|  | In-reactor blend | Xylene insoluble fraction | Xylene soluble fraction |
|---|---|---|---|
| Fraction (wt. %) |  | 56.6 | 43.4 |
| Tc (° C.) | 104.2 | 101.6 | 48.2 |
| Tm (° C.) | 140.7 | 141.2 | 82.2 |
| Tg (° C.) | −25.9 |  | −27.3 |
| Heat of fusion (J/g) | 33.4 | 74.1 | 41.8 |
| Tc from a secondary peak (° C.) | 51.7 |  |  |
| Tm from a secondary peak (° C.) | 73.1 |  |  |
| Heat of fusion from a secondary peak (J/g) | 10.6 |  |  |

While there have been described what are presently believed to be the preferred embodiments of the present invention, those skilled in the art will realize that other and further embodiments can be made without departing from the spirit of the invention, and is intended to include all such further modifications and changes as come within the true scope of the claims set forth herein. The expressly described embodiments include the following embodiments.

An in-reactor polymer blend of this paragraph A comprising (a) a propylene-containing first polymer; and (b) propylene-containing second polymer having a different crystallinity from the first polymer, wherein the polymer blend has a melting temperature, Tm, of at least 135° C., a melt flow rate of at least 70 dg/min, a tensile strength of at least 8 MPa, an elongation at break of at least 300%.

An in-reactor polymer blend of this paragraph B comprising (a) a propylene-containing first polymer; and (b) propylene-containing second polymer having a different crystallinity from the first polymer, wherein the polymer blend has a melting temperature, Tm, of at least 135° C., a melt flow rate of at least 70 dg/min, a tensile strength of at least 8 MPa, an elongation at break of at least 300%, and a branched block product having peaks in the 44 to 45 ppm range in the $^{13}$C-NMR spectrum.

The blend of this paragraph C as described in paragraph A or paragraph B, wherein the propylene containing first polymer has weight average molecular weight ranging from about 20,000 g/mol to about 150,000 g/mol and has a higher crystallinity than the propylene-containing second polymer.

The blend of this paragraph D as described in any of paragraphs A to B and having a melting temperature, Tm, of at least 140° C.

The blend of this paragraph E as described in any of paragraphs A to D and having a melt flow rate of at least 100 dg/min.

The blend of this paragraph F as described in any of paragraphs A to E and having a complex viscosity at 190° C. of less than or equal to 4000 Pa·s.

The blend of this paragraph G as described in any of paragraphs A to F, wherein the ratio of the complex viscosity of the blend at a frequency of 100 rad/s to its zero shear viscosity is 0.25 or greater when measured at 190° C.

The polymer blend of this paragraph H as described in any of paragraphs A to G, wherein the difference in crystallinity between said first and second polymers is at least 5%.

The polymer blend of this paragraph I as described in any of paragraphs A to H, wherein the difference in crystallinity between said first and second polymers is at least 10%.

The polymer blend of this paragraph J as described in any of paragraphs A to I and comprising at least 20 wt. % of the lower crystallinity polymer component.

The polymer blend of this paragraph K as described in any of paragraphs A to J, wherein said first polymer comprises a propylene homopolymer.

The polymer blend of this paragraph L as described in any of paragraphs A to K, wherein said second polymer is a copolymer of propylene with ethylene or a $C_4$ to $C_{20}$ α-olefin.

The polymer blend of this paragraph M as described in any of paragraphs A to L, wherein said second polymer is a copolymer of propylene with ethylene or a $C_4$ to $C_8$ α-olefin.

The polymer blend of this paragraph N as described in any of paragraphs A to M, wherein said second polymer is a copolymer of propylene with ethylene.

A process in this paragraph O for producing the polymer blend as described in any of paragraphs A to N, the process comprising:

(i) polymerizing at least one first monomer composition comprising propylene in a first polymerization zone under conditions sufficient to produce a propylene containing first polymer comprising at least 50% vinyl chain ends; and (ii) contacting at least part of said first polymer with a second monomer composition comprising propylene in a second polymerization zone separate from said first polymerization zone under conditions sufficient to polymerize said second monomer to produce a second polymer different in crystallinity from said first polymer by at least 5%.

The process of this paragraph P as described in paragraph O, wherein the conditions employed in said polymerizing (i) comprise a first temperature and the conditions employed in said contacting (ii) include a second temperature higher than said first temperature.

The process of this paragraph Q as described in paragraph O or P, wherein the first propylene containing polymer has a higher crystallinity than the second polymer.

The process of this paragraph R as described in any of paragraphs O to Q, wherein the propylene-containing polymer having the higher crystallinity has a weight averaged molecular weight ranging from about 20,000 g/mol to about 150,000 g/mol.

The process of this paragraph S as described in any of paragraphs O to R, wherein the temperature in the polymerization zone making the polymer having the higher crystallinity is between about 90° C. and about 180° C.

The process of this paragraph T as described in any of paragraphs O to S, wherein said second temperature is between about 70° C. and about 200° C.

The process of this paragraph U as described in any of paragraphs O to T, wherein at least the polymerizing step (ii) is conducted by solution polymerization.

The process of this paragraph V as described in any of paragraphs O to U, wherein at least the second monomer composition is substantially free of polyenes.

The process of this paragraph W as described in any of paragraphs O to V, wherein the first monomer composition comprises ethylene.

The process of this paragraph X as described in any of paragraphs O to W, wherein the second monomer composition comprises ethylene.

The process of this paragraph Y as described in any of paragraphs O to X, wherein the monomer concentration in said contacting (ii) is less then 5 mole/liter.

The process of this paragraph Z as described in any of paragraphs O to Y, wherein each of the polymerizing (i) and contacting (ii) is conducted in the presence of a single site catalyst comprising at least one metallocene catalyst and at least one activator.

The process of this paragraph AA as described in any of paragraphs O to Z, particularly paragraph Z, wherein said at least one metallocene catalyst comprises a bridged bis-indenyl metallocene catalyst having a substituent on one or both of the 2- and 4-positions of one or more of the indenyl rings.

The process of this paragraph AB as described in any of paragraphs O to AA, wherein each of the polymerizing (i) and contacting (ii) is conducted by a continuous solution polymerization process.

The process of this paragraph AC as described in any of paragraphs O to AB, wherein contacting (ii) includes producing a branched block product having peaks in the 44 to 45 ppm range in the $^{13}$C-NMR spectrum.

A component of this paragraph AD molded from the in-reactor polymer as described in any of paragraphs A to N.

What is claimed is:

1. An in-reactor polymer blend comprising (a) a propylene-containing first polymer; and (b) a propylene-containing second polymer having a different crystallinity from the first polymer, wherein the polymer blend has a melting temperature, Tm, of at least 135° C., a melt flow rate of at least 70 dg/min, a tensile strength of at least 8 MPa, and an elongation at break of at least 300%.

2. The blend of claim 1, wherein the propylene-containing first polymer has a weight average molecular weight ranging from about 20,000 g/mol to about 150,000 g/mol and has a higher crystallinity than the propylene-containing second polymer.

3. The blend of claim 1, having a melting temperature, Tm, of at least 140° C.

4. The blend of claim 1, having a melt flow rate of at least 100 dg/min.

5. The blend of claim 1, having a complex viscosity at 190° C. of less than or equal to 4000 Pa·s.

6. The blend of claim 1, wherein the ratio of the complex viscosity of the blend at a frequency of 100 rad/s to its zero shear viscosity is 0.25 or greater when measured at 190° C.

7. The polymer blend of claim 1, wherein said first polymer comprises a propylene homopolymer.

8. The polymer blend of claim 1, wherein said second polymer is a copolymer of propylene with ethylene.

9. The polymer blend of claim 1, further comprising (c) a branched block product having peaks in the 44 to 45 ppm range in the $^{13}$C-NMR spectrum.

10. An in-reactor polymer blend comprising (a) a propylene-containing first polymer; and (b) a propylene-containing second polymer having a different crystallinity from the first polymer, wherein the polymer blend has a melting temperature, Tm, of at least 135° C., a melt flow rate of at least 70 dg/min, a tensile strength of at least 8 MPa, an elongation at break of at least 300%, and (c) a branched block product having peaks in the 44 to 45 ppm range in the $^{13}$C-NMR spectrum.

11. The blend of claim 10, having a melting temperature, Tm, of at least 140° C.

12. The blend of claim 10, having a melt flow rate of at least 100 dg/min.

13. The blend of claim 10, having a complex viscosity at 190° C. of less than or equal to 4000 Pa·s.

14. The blend of claim 10, wherein the ratio of the complex viscosity of the blend at a frequency of 100 rad/s to its zero shear viscosity is 0.25 or greater when measured at 190° C.

15. The polymer blend of claim 10, wherein said first polymer comprises a propylene homopolymer.

16. The polymer blend of claim 10, wherein said second polymer is a copolymer of propylene with ethylene.

17. The polymer blend of claim 10, wherein the propylene-containing first polymer has a weight average molecular weight ranging from about 20,000 g/mol to about 150,000 g/mol and has a higher crystallinity than the propylene-containing second polymer.

18. A process for producing a polymer blend, the process comprising:
  (i) polymerizing at least one first monomer composition comprising propylene in a first polymerization zone under conditions sufficient to produce a propylene containing a first polymer comprising at least 50% vinyl chain ends; and
  (ii) contacting at least part of said first polymer with a second monomer composition comprising propylene in a second polymerization zone separate from said first polymerization zone under conditions sufficient to polymerize said second monomer to produce a second polymer different in crystallinity from said first polymer by at least 5%.

19. The process of claim 18, wherein the conditions employed in said polymerizing (i) comprise a first temperature and the conditions employed in said contacting (ii) include a second temperature higher than said first temperature.

20. The process of claim 18, wherein the propylene-containing polymer having the higher crystallinity has a weight averaged molecular weight range from about 20,000 g/mol to about 150,000 g/mol.

21. The process of claim 18, wherein the temperature in the polymerization zone making the polymer having the higher crystallinity is between about 90° C. and about 180° C.

22. The process of claim 18, wherein the monomer concentration in said contacting (ii) is less than 5 mole/liter.

23. The process of claim 18, wherein contacting (ii) includes producing a branched block product having peaks in the 44 to 45 ppm range in the $^{13}$C-NMR spectrum.

24. A component molded from the in-reactor polymer blend of claim 1.

25. A component molded from the in-reactor polymer blend of claim 10.

* * * * *